(12) United States Patent
Takahashi

(10) Patent No.: US 6,754,328 B1
(45) Date of Patent: Jun. 22, 2004

(54) NODE EQUIPMENT, TERMINAL EQUIPMENT, AND STORAGE MEDIUM WHICH STORES PROGRAM FOR REALIZING THESE EQUIPMENTS

(75) Inventor: Hiroko Takahashi, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/474,167

(22) Filed: Dec. 29, 1999

(30) Foreign Application Priority Data

Feb. 9, 1999 (JP) .......................................... 11-031643

(51) Int. Cl.[7] .............................................. H04M 7/00
(52) U.S. Cl. .............................. 379/220.01; 379/221.01
(58) Field of Search .............................. 379/219–221.02

(56) References Cited

U.S. PATENT DOCUMENTS 5,483,589 A * 1/1996 Ishida et al. .............. 379/22.01
6,304,646 B1 * 10/2001 Liot et al. .............. 379/201.04

FOREIGN PATENT DOCUMENTS

JP 10-136024 5/1998

* cited by examiner

Primary Examiner—Ahmad F. Matar
Assistant Examiner—Hector Agdeppa
(74) Attorney, Agent, or Firm—Katten Muchin Zavis Rosenman

(57) ABSTRACT

A node equipment according to the present invention makes a record of unique identification information and a network identifier indicating an accommodated network of a plurality of networks with regard to both or either of an originating party and a destination party of an originated call, and with regard to the succeeding originated call, it performs routing selecting a network indicated by an identifier which is a record corresponding to identification information on a destination party of the call as a candidate for an outgoing line. Accordingly, maintenance and operation cost are reduced, and quality and reliability in service are improved without complexing an operation performed at an originating party.

20 Claims, 13 Drawing Sheets

FIG. 11

(a) EXPANSION REQUEST

| ... | 0 0 0 | ... | ADDRESS A | SERVOCE ORDER | ... |

(b) EXPANSION RESPONCE

| ... | 1 0 0 | ADDRESS A | EXTENSION NUMBER a | ... |

(c) RELOCATION REQUEST

| ... | 0 0 1 | FORMER EXTEN-SION NUMBER (=1300) | ADDRESS Ar | SERVOCE ORDER | ... |

(d) RELOCATION RESPONCE

| ... | 1 0 1 | ADDRESS Ar | EXTENSION NUMBER ar | ... |

(e) STATE CHANGE REQUEST

| ... | 0 1 0 | EXTENSION NUMBER (=1300) | ADDRESS Ar | SERVOCE ORDER | ... |

(f) STATE CHANGE RESPONCE

| ... | 1 1 0 | ADDRESS Ar | ... |

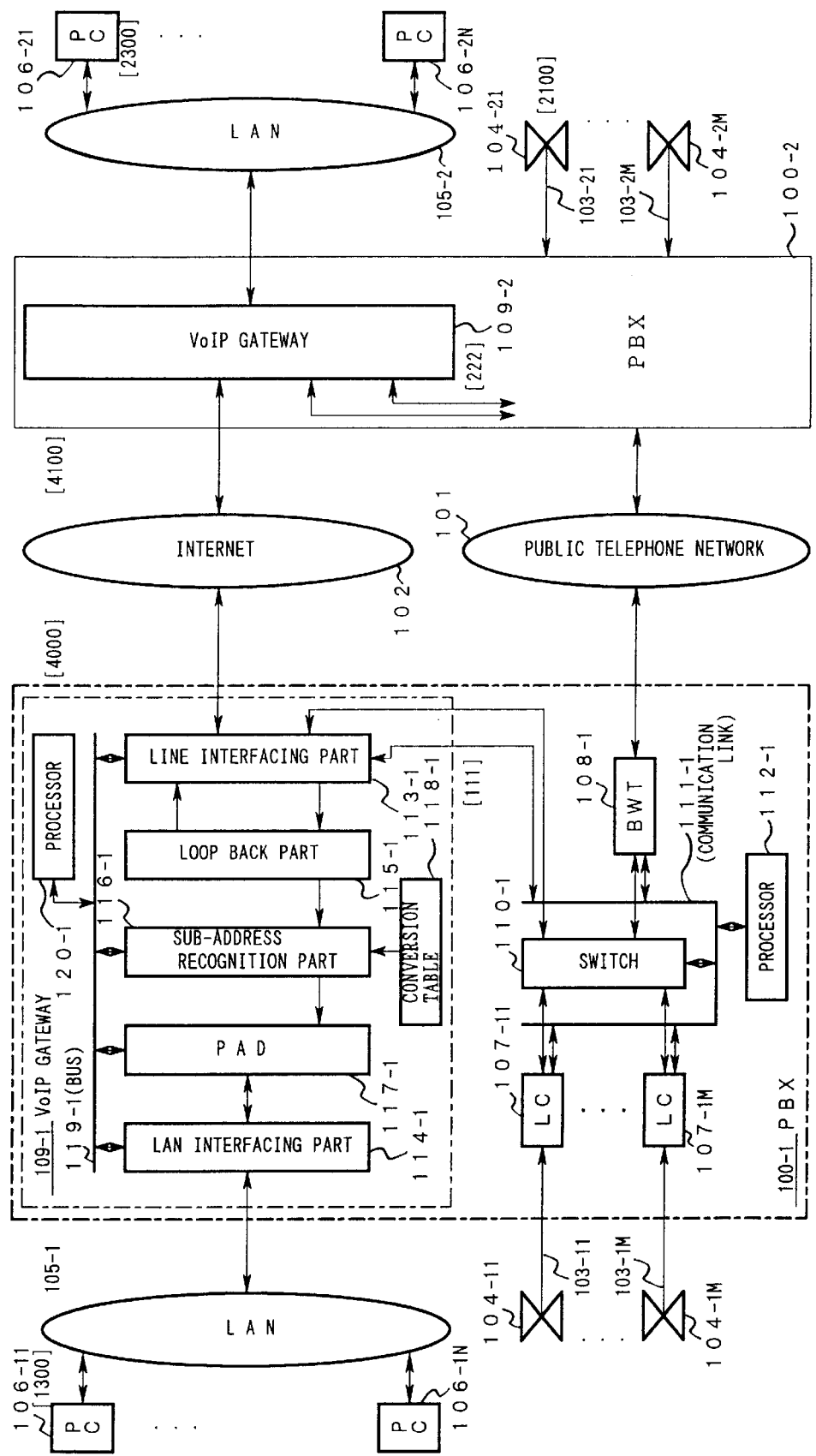
PRIOR ART FIG. 12

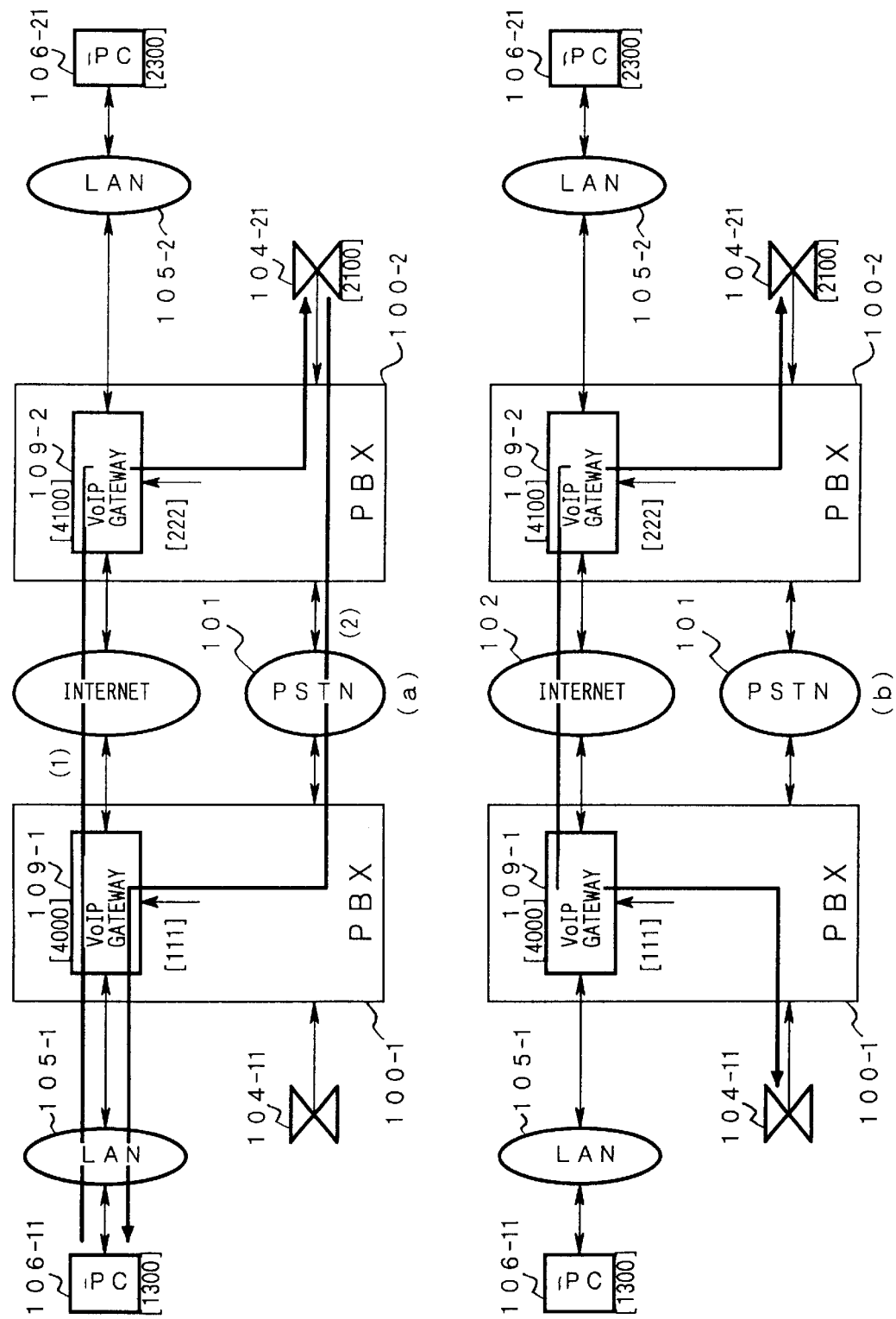

NODE EQUIPMENT, TERMINAL EQUIPMENT, AND STORAGE MEDIUM WHICH STORES PROGRAM FOR REALIZING THESE EQUIPMENTS

BACKGROUND OF THE INVENTION

1. Field of the Invention

The present invention relates to a node equipment which provides a predetermined communication interface at a relay point or an end of a communication network, a terminal equipment accommodated in the node equipment via any communication link, and a storage medium which stores a program for realizing the equipments.

2. Description of the Related Art

In recent years, a variety of communication systems and data terminals are being put into practice by combining advanced digital transmission technology and advanced information processing technology.

Of such communication systems, particularly, LAN and the internet are applied to not only transferring E-mails and files but also speech communication and pictorial communication, and are also being realized connecting with existing telephone networks and other communications, along with price reduction in hardware and multimedia data terminals improved in throughputs.

FIG. 12 is a diagram showing an example of a construction of a communication system made of a plurality of PBXs connected to a public telephone network and the internet.

In the example shown in FIG. 12, PBXs 100-1 and 100-2 are connected to a public telephone network 101 and the internet 102. Interior wires 103-11 to 103-1M of the PBX 100-1 and interior wires 103-21 to 103-2M of the PBX 100-2 are respectively connected to terminals 104-11 to 104-1M and 104-21 to 104-2M. The PBXs 100-1 and 100-2 are respectively connected to LANs 105-1and 105-2, and the LANs 105-1 and 105-2 are respectively connected to data terminals (PCs), such as personal computers and others 106-11 to 106-1N and 106-21 to 106-2N.

The PBX 100-1 is made of extension trunks (LCs) 1071-1 to 107-1M individually connected to the interior wires 103-11 to 103-1M, a line wire trunk (BWT) 108-1 connected to the public telephone network 101, a VoIP gateway 109-1 connected to the internet 102, a switch 110-1 having ports respectively connected to the extension trunks 107-11 to 107-1M, the line wire trunk 108-1 and to the VoIP gateway 109-1, and a processor 112-1 connected to a communication link 111-1 together with the extension trunks 107-11 to 107-1M, the line wire trunk 108-1, the VoIP gateway 109-1 and the switch 110-1.

The VoIP gateway 109-1 is made of a line interfacing part 113-1 connected to a port corresponding to the switch 110-1, the communication link 111-1 and the internet 102, a LAN interface part 114-1 connected to the LAN 105-1, a loop back part 115-1, a sub-address recognition part 116-1, a PAD 117-1 and a conversion table 118-1 connected to an input corresponding to the sub-address recognition part 116-1 cascaded between the line interfacing part 113-1 and the LAN interface part 114-1, and a processor 120-1 connected to a bus 119-1 together with the line interfacing part 113-1, the LAN interface part 114-1, the sub-address recognition part 116-1 and the PAD 117-1.

Since the construction of the PBX 100-2 is identical to that of the PBX 100-1, the description thereof is omitted herein. In the following, identical reference numerals added "2" as a first suffix number are used to denote the corresponding components of the PBX 100-2.

In the conventional example of the above-described construction, the data terminal 106-11 is accommodated in the PBX 100-1 as an extension terminal via the LAN 105-1 and the VoIP gateway 109-1, and has a unique extension number assigned in advance as office data for the PBX 100-1. In the following, it is assumed that the extension number assigned to the data terminal 106-11 is "1300" for simplicity.

Moreover, in the PBX 100-1, a line number to be used for identifying an incoming line or an outgoing line which corresponds to the LAN 105-1 or the internet 102 is assigned to a port (hereinafter referred as the "first particular port") connected to the VoIP gateway 109-1 in advance among the ports of the switch 110-1. The line number is held as the above-described office data, and is assumed to be "111" for simplicity.

In addition, in the PBX 100-2, an extension number "2100" is assigned to the terminal 104-21; a line number "222" for identifying an incoming line or an outgoing line which corresponds to the LAN 105-2 or the internet 102, is assigned to a port (hereinafter referred to as the "second particular port") connected to the VoIP gateway 109-2 in advance among the ports of the switch 110-2. The extension numbers and line number are held as office data.

Moreover, a unique number "4000" (hereinafter referred as the "GW number") indicating the entire node equipment 106-11 to 106-1N connected to the LAN 105-1 is assigned to the VoIP gateway 109-1 in advance, and the number is managed by the processors 112-1 and 120-1.

Unique IP addresses individually assigned to the terminals 104-11 to 104-1M (the interior wires 103-11 to 103-1M) are stored in advance in the conversion table 118-1 for records which correspond to the corresponding extension numbers.

Such IP addresses are assigned in a various form adapted to each access point of the internet 102, but it is not a feature of the present invention, the description thereof is omitted herein.

Similarly, a unique GW number "4100" indicating an equipment connected to the LAN 105-2 is assigned to the VoIP gateway 109-2 in advance.

Unique IP addresses individually assigned to the terminals 104-21 to 104-2M (the interior wires 103-21 to 103-2M) are stored in advance in the conversion table 118-2 for records that correspond to the corresponding extension numbers.

The data terminal 106-11 is provided with hardware and software operating as an internet telephone.

Moreover, when, for example, a call to the terminal 104-21 accommodated in the interior wire 103-21 of the PBX 100-2 is originated at the data terminal 106-11, an operator sets a phone number made of a sequence of the above-described GW number "4000", the line number "222" and the extension number "2100".

The data terminal 106-11 transmits a message, which contains the phone number and indicates an origination request, to the VoIP gateway 109-1 via the LAN 105-1 in the form of a packet.

In the VoIP gateway 109-1, the PAD 117-1 disassembles the packet given via the LAN interface part 114-1, and transfers the information contained in the packet to the processor 120-1 via the bus 119-1.

The processor 120-1 compares the GW number "4000" given in this manner and the GW number (=4000) given in advance. When the processor 120-1 determines that both numbers are equal to each other, the processor 120-1 selects the internet 102 as an outgoing line for the corresponding call from the internet 102 and a route formed between the processor 120-1 and the port corresponding to the switch 110-1.

In addition, the processor 120-1 generates a predetermined form of IP packet containing the GW number "4000", the route number "222" and the extension number "2100", are contained in the above-described phone number, and performs origination by transmitting the IP packet to the internet 102 via the bus 119-1 and the line interfacing part 113-1 on the basis of a predetermined protocol.

On the other hand, in the VoIP gateway 109-2 provided in the PBX 100-2, a line interfacing part 113-2 transfers the IP packet given via the internet 102 and contains the GW number "4000", the line number "222" and the extension number "2100" to the loop back part 115-2.

The loop back part 115-2 determines whether the destination of the IP packet is in the local station, and when the result is true, the loop back part 115-2 transfers the IP packet to the sub-address recognition part 116-2.

The sub-address recognition part 116-2 determines whether the line number "222" contained in the IP packet given in this manner indicates a route formed between the VoIP gateway 109-2 and a corresponding port of the switch 110-2.

When the result is true, the sub-address recognition part 116-2 transfers controlling information showing the result and the corresponding IP packet to the processor 120-2 via a bus 119-2.

The processor 120-2 identifies the IP packet given together with the controlling information for information relative to a call whose destination party is to be any of the terminals 104-21 to 104-2M accommodated in the PBX 100-2.

Moreover, the processor 120-2 transfers the above-described IP packet to the processor 112-2 via the communication link 111-2.

Accordingly, the processor 112-2 identifies the occurrence of an incoming call to the terminal 104-21 assigned the extension number "2100" contained in the IP packet, and performs call processing on the incoming call.

In addition, in the process of the call processing, the processor 112-2 identifies a signaling signal (line signal) transferred to the terminal 104-21 and the data terminal 106-11.

In the process of the call processing, the VoIP gateway 109-2 performs protocol conversion between the internet 102 and the communication link 111-2 as well as the second particular port. The VoIP gateway 109-1 also performs protocol conversion between the internet 102 and the LAN 105-1.

Moreover, in the process of the call processing, the processors 120-1 and 120-2 respectively inform the terminal 104-21 (the destination party) and the data terminal 106-11 (the originating party) of pre-assigned IP addresses (hereinafter referred to as the "destination addresses") by transferring predetermined controlling packets to each other via the line interfacing parts 113-1, 113-2 and the internet 102.

In addition, when the processor 112-2 recognizes that the corresponding incoming call has become a completed call on the basis of the above-described call processing procedure, the processor 112-2 gives a notice of the recognition to the processor 120-2, and forms a speech path between the interior wire 103-21 and the VoIP gateway 109-2 by controlling the switch 110-2 via the communication link 111-2.

Moreover, in the VoIP gateway 109-2, when the processor 120-2 is given the above-described notice, the processor 120-2 gives the notice to the processor 120-1 via the line interfacing part 113-2, the internet 102 and the line interfacing part 113-1.

Moreover, in the process of the above-described protocol conversion, the processor 120-2 gives an instruction to the sub-address recognition part 116-2 and the PAD 117-2 that the IP address assigned to the terminal 104-21 and the extension number "2100" of the terminal 104-21 are to be mutually converted, and the above-described "destination address" is to be applied to the destination of an IP packet containing a speech signal, a signaling signal (line signal) and a register signal to be transmitted to the data terminal 106-11 which is the originating party.

In the VoIP gateway 109-1, in the process of the above-described protocol conversion performed in the VoIP gateway 109-2, given the above-described notice to the processor 120-1, the processor 120-1 gives an instruction to the sub-address recognition part 116-1 and the PAD 117-1 that the above-described "destination address" is to be applied to the destination of an IP packet containing a speech signal, a signaling signal (line signal) and a register signal to be transmitted to the terminal 104-21 which is the destination party.

Accordingly, a channel passing through the internet 102 as shown in FIG. 13(*a*)(1) is formed between the data terminal 106-11 accommodated in the LAN 105-1 and the terminal 104-21 accommodated in the PBX 100-2.

When, for example, the terminal 104-11 instead of the data terminal 106-11 is an originating party, the terminal 104-11 adds the GW number "4000" assigned to the VoIP gateway 109-1 at the time of origination or the route number "111" assigned to the above-described first particular port, to the head of the phone number.

The processor 112-1 selects the above-described first particular port as an outgoing line by translating the phone number and performing routing.

Moreover, the VoIP gateway 109-1 performs an operation identical to the previously described one under the control of the processor 120-1, except that the line interfacing part 113-1 operates instead of the LAN interface part 114-1.

Accordingly, a channel passing through the PBX 100-1, the internet 102 and the PBX 100-2 as shown in FIG. 13(*b*) is go formed between the terminals 104-11 and 104-21.

When, for example, a call to the data terminal 106-11 accommodated in the LAN 105-1 is originated at the terminal 104-21, the above-described GW number "4000" is not contained in an IP packet.

Moreover, at the terminal 104-21, a phone number made of the previously described route number "111" and an extension number "1300" assigned to the data terminal 106-11 is set by an operator.

In the PBX 100-2, the processor 112-2 performs call processing on the call originated at the terminal 104-21 in this manner, by coordinating with an extension trunk 107-21, a line wire trunk 108-2 and the switch via the communication link 111-2.

In the process of the call processing, under a code translation based on a numbering plan, the above-described phone number is transferred to the PBX 100-1 via the public telephone network 101 as notice of an incoming call.

In the PBX 100-1, the phone number is given to the processor 112-1 via the line wire trunk 108-1 and the communication link 111-1, and the processor 112-1 refers to the phone number for routing.

Moreover, the processor 112-1 transmits an incoming notice containing the phone number to the VoIP gateway 109-1 via the first particular port corresponding to the route number "111" contained in the phone number.

In the VoIP gateway 109-1, concerning the data terminals 106-11 to 106-1N, extension numbers individually assigned in advance and unique addresses assigned on the LAN 105-1 are given to the processor 120-1 corresponding respectively each other.

Under the control of the processor 120-1, the line interfacing part 113-1, the loop back part 115-1, the sub-address recognition part 116-1, the PAD 117-1 and the LAN interface part 114-1 interface the transmission system and the protocol of the LAN 105-1 with a signaling system applied to the previously described first particular port, while performing mutual conversion between the extension number "1300" of the data terminal 106-11 (the destination party) and the address of the data terminal 106-11 on the LAN 105-1.

Accordingly, a channel passing through the public telephone network 101 as shown in FIG. 13(a)(2) is formed between the terminal 104-21 accommodated in the PBX 100-2 and the data terminal 106-11 accommodated in the LAN 105-1, and both terminals are used in speech communication service.

However, in the above-described conventional example, when the data terminal 106-11 originates a call to the terminal 104-21 so that a completed call occurs, an operator of the data terminal 106-11 generally does not recognize the IP address assigned to the data terminal 106-11 at the time of origination. Moreover, the IP address is not always the same.

Accordingly, when the operator of the terminal 104-21 is to originate a call to the data terminal 106-11, the operator must utilize the extension number of the data terminal 106-11 which is orally informed in a previous call, or which is obtained by a predetermined inquiry or reference to extension number's list.

In other words, in spite that the public telephone network 101 is in general more expensive in cost compared to the internet 102, it is needlessly frequently utilized.

In addition, when either of an originating party and a destination party is a data terminal accommodated in the LAN 105-1 or 105-2 or the internet 102 and the other is any of the terminals 104-11 to 104-1M and 104-21 to 104-2M directly accommodated in the PBX 100-1 and 100-2, either of the GW numbers "4000" and "4100" respectively assigned to the VoIP gateway 109-1 and 109-2 must be added to a phone number to be set at the time of origination.

In other words, since the number of digits of the phone number set at the time of origination is large, there is an increasing possibility of termination to an improper party or an incomplete call.

Moreover, when any of the terminals 104-11 to 104-1M and 104-21 to 104-2M directly accommodated in the PBXs 100-1 and 100-2 is an originating party, it is remarkably complicated and actually impossible to set a phone number by clearly grasping the difference in charging system, the degree and frequency of congestion, and other factors at the time of origination between the public telephone network 101 and the internet 102, (regarding the internet, the factors depend on what facilities or transmission speed of the internet backbone providers have).

In addition, the correspondence between the extension numbers and IP addresses registered in advance in the conversion tables 118-1 and 118-2 must be appropriately updated by personnel in case any of the data terminals 106-11 to 106-1N and 106-21 to 106-2N accommodated in the PBXs 100-1 and 100-2 via the VoIP gateways 109-1 and 109-2 is expanded, removed or relocated.

SUMMARY OF THE INVENTION

An object of the present invention is to provide a node equipment, a terminal equipment and a recording medium capable of automatically forming a channel to a desired communication network without changing a phone number set by an originating party, and capable of smoothly achieving expanding, removing or relocating a terminal accommodated vie any network.

Another object of the present invention is to reapply a network applied to a channel for an actual originated call, without any restrictions on the setting of an incoming call to be performed at an originating party of the succeeding originating call.

Another object of the present invention is to avoid the occurrence of a useless incomplete call.

Moreover, another object of the present invention is to realize functional distribution and load distribution flexibly adapted to the distribution of traffic.

Another object of the present invention is to realize functional distributions and load distributions by a plurality of node equipments.

Another object of the present invention is to minimize the probability of unnecessarily deteriorating service quality or the occurrence of an incomplete call due to relocation, removal or a change of service order, when either a terminal being an originating party or a destination party, or a node equipment accommodating the terminal, even if no record stored in advance is updated at the time of the above-described occasions.

Moreover, another object of the present invention is to make it possible to apply the present invention to a node equipment accommodating any terminal such as a local switch or a PBX.

Moreover, another object of the present invention is to reducing the size of a storage area, throughput and other resources.

Another object of the present invention is to avoid the occurrence of a useless incomplete call with high reliability due to not updating stored records, according to a change in service order.

Moreover, another object of the present invention is to maintain high service quality and reduce running cost.

Another object of the present invention is to reduce maintenance and operation cost and to improve service quality and reliability without complexing the operation of an accommodated terminal equipment.

The above-described objects are achieved by a node equipment which makes a record of unique identification information and a network identifier indicating an accommodated network of a plurality of networks with regard to both or either of an originating party and a destination party of a call, and when the succeeding call has occurred, it performs routing selecting a network indicated by an identifier obtained as a record corresponding to identification information of a destination party of the call as a candidate for an outgoing line.

In the node equipment, concerning a call whose destination party is either an originating party or a destination party of the network indicated by the above-described network identifier is selected as an outgoing line.

Accordingly, a network applied as a channel for an actual call is reapplied without any restriction on the setting of a destination party to be performed at an originating party of the succeeding call.

The above-described objects are achieved by a node equipment which makes the above-described record only in the case of a completed call.

In the node equipment, the occurrence of a useless incomplete call is avoided, since the record does not contain identification information indicative of a node equipment or a terminal actually inoperative due to removal, relocation or a trouble and a network identifier indicating a network connected to the node equipment or the terminal.

Moreover, the above-described objects are achieved by a node equipment which transmits identification information and a network identifier objected for recording, to a network connected to neither an incoming line nor an outgoing line of a call objected for recording.

In the node equipment, identification information indicating both or either of an originating party and a destination party and a network identifier indicating a network actually forming channel for the call are given even to a call with neither call setup nor protocol conversion performed.

Accordingly, the node equipment can select a network indicated by the network identifier as a candidate for an outgoing line at routing of a call of a local station, by referring to a combination of the identification information and the network identifier.

In addition, the above-described objects are achieved by a node equipment which transmits identification information and a network identifier only to a node equipment or a terminal indicated by the identification information.

In the node equipment, since the above-described combination is divided, distributed, and accumulated for each terminal or node equipment which is assigned identification information individually included in the combination, load distribution and functional distribution can be realized in a form adapted to the distribution of traffic.

Moreover, the above-described objects are achieved by excluding the above-described transmitted identification information and a network identifier from accumulation.

In the node equipment, combinations already accumulated in any other node equipment connected via a communication link or a network are not accumulated as a record.

Accordingly, the load or the function necessary to make the record is distributed to a plurality of node equipments.

In addition, the above-described objects are achieved by a node equipment which makes a record of identification information and a network identifier given from outside, and applies the record to routing of the succeeding originated call.

In the node equipment, load distribution and functional distribution are flexibly realized even if a local station performs neither call setup nor protocol conversion to a call, because identification information indicating an originating party or a destination party of the call and an network identifier indicating a network having a channel for the call are obtained.

Moreover, the above-described objects are achieved by a node equipment which makes a record of the time when a call has occurred in addition to identification information and a network identifier, and which deletes or invalidates the record made of the identification information, a network identifier and time, when the expiration time exceeds a predetermined upper limit.

In the node equipment, the time necessary for accumulating a combination of identification information and network identification information for recording is limited to the predetermined upper limit or below, so that it is possible to minimize the probability of unnecessarily deteriorating service quality or of the occurrence of an incomplete call due to relocation, removal or change of service order, even when no records accumulated in advance are updated at the time of either a terminal being an originating party or a destination party or a node equipment accommodating the terminal in the above-described occasions.

In addition, the above-described objects are achieved by a node equipment which accommodates terminals capable of being originating parties or destination parties and makes a record of a call that has occurred at any of the terminals.

In the node equipment, with regard to a call whose originating party or destination party corresponds to any of the terminals accommodated in a local station, a combination containing identification information of the terminal is made for recording.

Accordingly, the present invention is also applied to a node equipment accommodating any terminal such as a local switch or a PBX.

Moreover, the above-described objects are achieved by a node equipment which adds an address unique to a terminal that is the corresponding originating party or destination party to identification information for recording.

In the node equipment, the information content of combinations to be accumulated as a record is the minimum necessary to specify a network, which becomes a candidate for an outgoing line at the time of routing.

Accordingly, the size of a storage area and the throughput necessary for accumulating a record as well as other resources are reduced.

The above-described objects are achieved by a node equipment which updates both or either of office data and a record according to a service order given by a terminal.

In the node equipment, combinations accumulated as a record are updated according to updating a service order in a terminal, which is an originating party or a destination party.

Accordingly, a useless incomplete call and deterioration in service quality due to no update are avoided with high reliability.

Moreover, the above-described objects are achieved by a terminal equipment connected to the above-described node equipment which gives a desired service order to the node equipment.

In the terminal equipment, high service quality is maintained and running cost is reduced since a service order indicating an operating condition of a terminal equipment according to the present invention is transferred to a node equipment accommodating the terminal equipment.

The above-described objects are achieved by a storage medium which stores a program operating a computer as a part of all of the components of the above-described node equipment under a predetermined functional distribution or load distribution, and which is also computer-readable.

The storage medium stores the program which operates a computer as a part or all of the components of a node equipment according to the present invention, and which is also computer-readable. The program is made of software to be executed by a computer or a microprogram built in the computer, and can be circulated by being recorded on a removable storage medium separate from the computer.

Accordingly, the computer reading and executing the program in the storage medium according to the present invention is a component of the above-described node equipment.

Moreover, the above-described objects are achieved by a storage medium which stores a program operating a computer as a means of comprising the above-described node equipment, and which is also computer-readable.

The storage medium stores the program which operates the computer as a part or all of the components of a terminal equipment according to the present invention, and which is also computer-readable. The program is made of software to be executed by the above-described computer or a microprogram built in the computer, and can be circulated by being recorded on a removable storage medium separate from the computer.

Accordingly, the computer reading and executing the program in the storage medium according to the present invention is a component of the above-described terminal equipment.

Further objects and features of the present invention will be explained thoroughly in detail in the following based on the drawings accompanied.

BRIEF DESCRIPTION OF THE DRAWINGS

FIG. 11 is a view showing messages transmitted and received-between a data terminal and a PBX;

FIG. 12 is a diagram showing an example of the construction of a communication system made of a plurality of PBXs connected to a public telephone network and the internet; and FIG. 13 is a diagram explaining the operation of a conventional example.

DESCRIPTION OF THE PREFERRED EMBODIMENTS

First of all, the principle of a node equipment, a terminal equipment and a storage medium according to the present invention will be described below.

Figure 1:
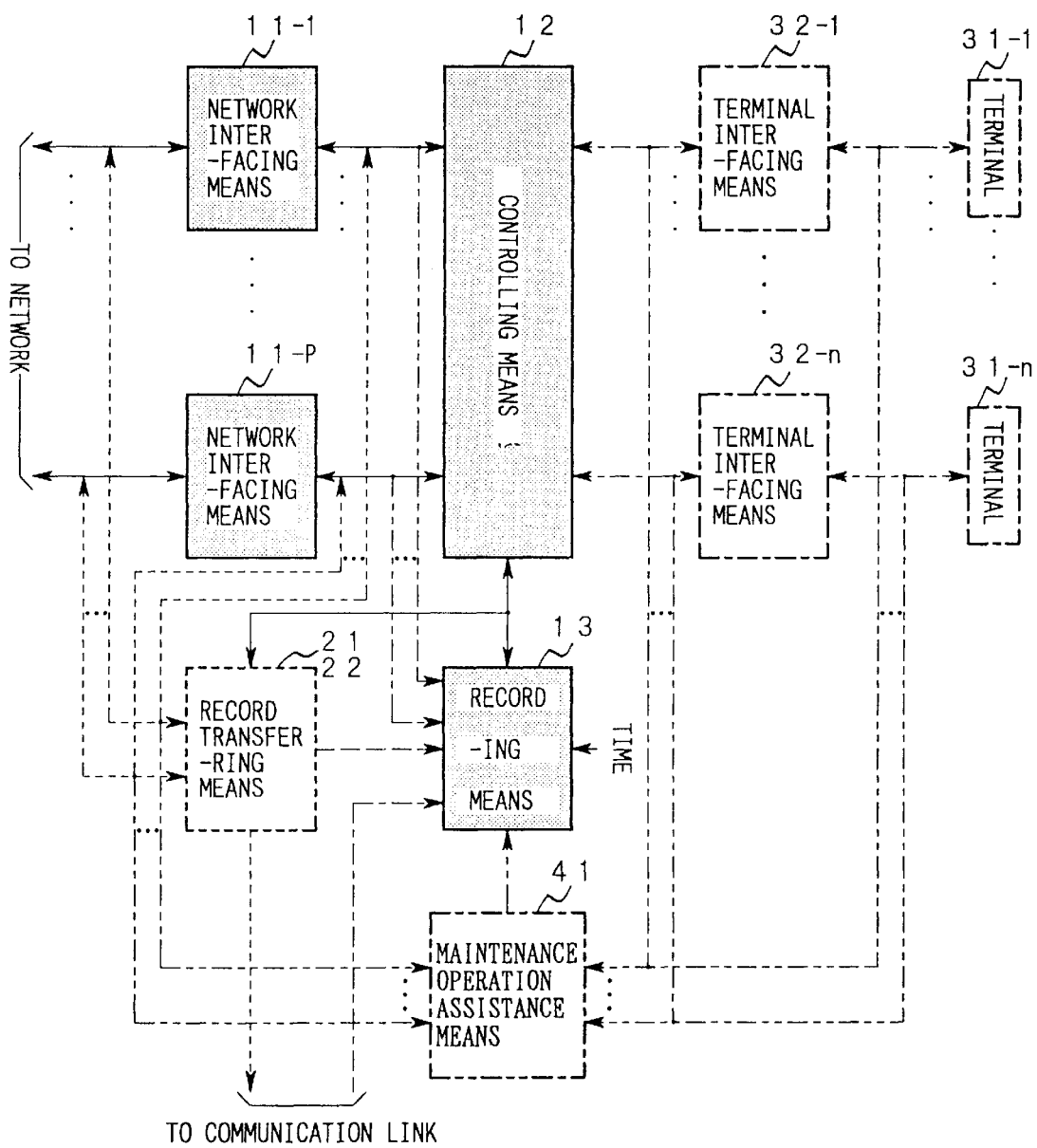
FIG. 1 is a block diagram showing the principle of a node equipment according to the present invention.

FIG. 1 is a block diagram showing the principle of a node equipment according to the present invention.

A first node equipment according to the present invention comprises: network interfacing means 11-1 to 11-P for individually providing a physical interface with a single or a plurality P (P is an integer of "2" or more) of networks; controlling means 12 for performing call setup or protocol conversion inclusive of routing on each individual call which occurs at both or either of the single or plurality P of networks and a local station, and acquiring a combination of identification information individually indicative of both or either of an originating party and/or a destination party and a network identifier indicative of a network which is connected to the originating party or destination party individually indicated by the identification information among the networks; and recording means 13 for making a record of the combination acquired by the controlling means 12, wherein the controlling means 12 selects a network which is indicated by a network identifier combined with identification information indicative of a destination party of the call as a candidate for an outgoing line in a process of routing, among identification information included in the combination whose record is made in advance by the recording means 13 when the call occurs at the single or plurality P of networks or the local station.

The principle of the first node equipment according to the present invention is as follows.

The network interfacing means 11-1 to 11-P individually provide a physical interface with the single or the plurality P of networks. The controlling means 12 performs call setup or protocol conversion inclusive of routing on each individual call which occurs at both or either of the networks and the local station, and acquires a combination of identification information individually indicative of both or either of an originating party and/or a destination party and a network identifier indicative of a network which is connected to the originating party or destination party individually indicated by the identification information among the networks. The recording means 13 makes a record of the combination acquired in this manner.

In addition, the controlling means 12 selects a network which is indicated by a network identifier combined with identification information indicative of a destination party of the call as a candidate for an outgoing line in a process of the routing, among identification information included in the combination whose record is made in advance by the recording means 13 when the call occurs at the single or plurality P of networks or the local station.

In other words, the network indicated by the network identifier contained in the combination obtained for recording by the recording means 13 is selected as an outgoing line when a destination party of an originated call corresponds to either an originating party or a destination party of the succeeding originated call as described above.

Accordingly, a network applied as a channel for an actual originated call is applied again without any restriction on the setting of a destination party to be performed at an originating party of the succeeding originated call.

A second node equipment according to the present invention has a construction in which, in the above-described first node equipment, the controlling means 13 makes a record of the combination acquired by the controlling means 12, only in the case of a call which is identified as a completed call by the controlling means 12 in the process of the call setup or making the protocol conversion.

The principle of the second node equipment according to the present invention is as follows.

The controlling means 13 makes a record of the combination acquired by the controlling means 12, only in the case of a call which is identified as a completed call by the controlling means 12 in the process of the call setup or making the protocol conversion.

In other words, a combination whose record is made by the recording means 13 does not newly contain identification information indicating a node equipment or a terminal actually inoperative due to removal, relocation or occurrence of a trouble and a network identifier indicating a network connected to the node equipment or the terminal.

Accordingly, a useless incomplete call which can be occurred in the above-described first node equipment is avoided.

A third node equipment according to the present invention has a construction in which the first or second node equipment further comprises record transferring means 21 for transmitting the combination acquired by the controlling means 12 to a communication link which does not correspond to any of the single or plurality P of networks or, among the networks, to a network other than the network indicated by the network identifier included in the combination.

The principle of the third node equipment according to the present invention is as follows.

The record transferring means 21 transmits the combination acquired by the controlling means 12 to a communication link which does not correspond to any of the single or plurality P of networks or, among the networks, to a network other than the network indicated by the network identifier included in the combination.

In other words, in the node equipment, identification information indicating both or either of an originating party and a destination party and a network identifier indicating a network actually forming channel for a call are given even to a call with neither call setup nor protocol conversion performed.

Accordingly, the node equipment can select a network indicated by the network identifier as a candidate for an outgoing line at routing of a call originated at a local station, by referring to a combination of the identification information and the network identifier.

A fourth node equipment according to the present invention has a construction in which the above-described first or second node equipment further comprises record transferring means 22 for giving the combination acquired by the controlling means 12 to a terminal or a node equipment indicated by the identification information included network identifier contained in the combination, via any of the single or plurality P of networks or via a communication link which does not correspond to any of the networks.

The principle of the fourth node equipment according to the present invention is as follows.

The record transferring means 22 gives the combination acquired by the controlling means 12 to a terminal or a node equipment indicated by the identification information included in the combination, via any of the single or plurality P of networks or via a communication link which does not correspond to any of the networks.

In the node equipment, a combination objected for recording, containing identification information assigned to each terminal or node equipment is divided, distributed and accumulated.

Accordingly, in the process of realizing the above-described first or second node equipment, load distribution and functional distribution are realized adapted to the distribution of traffic.

A fifth node equipment according to the present invention has a construction in which, in the above-described third or fourth node equipment, the recording means 13 excludes the combination, among the combinations acquired by the controlling means 12, transmitted to any communication link or network by the record transferring means 21 or 22 from being the object of the record, or deletes the combination itself from the record.

The principle of the fifth node equipment according to the present invention is as follows.

The recording means 13 excludes the combination, among the combinations acquired by the controlling means 12, transmitted to any communication link or network by the record transferring means 21 or 22 from being the object of the record, or deletes the combination itself from the record.

In other words, in the recording means 13, as described above, combinations already accumulated in any other node equipment connected via a communication link or a network are not accumulated as a record.

Accordingly, the load or the function necessary to keep the record is distributed to a plurality of node equipments.

A sixth node equipment according to the present invention has a construction in which, in any of the first to fifth node equipments, the recording means 13 makes a record of a combination of a network identifier and identification information, wherein the combination is given via the single or plurality P of networks or the communication link.

The principle of the sixth node equipment is as follows.

The recording means 13 makes a record of a combination of a network identifier and identification information, wherein the combination is given via the single or plurality P of networks or the communication link.

In other words, load distribution and functional distribution are flexibly realized in the process to be performed by the recording means 13 or the controlling means 12 even if a local station performs neither call setup nor protocol conversion to a call, because identification information indicating an originating party or a destination party of the call and an network identifier indicating a network having a channel for the call are obtained.

A seventh node equipment according to the present invention has a construction in which, in any of the above-described first to sixth node equipments, the recording means 13 makes the combination acquired by the controlling means 12 correspond to and a time given from outside when the combination is given, and makes records of both the combination and the corresponding time, along with invalidating, among combinations whose records are made in advance, a combination wherein a period of time which has elapsed from a corresponding time exceeds a predetermined upper limit.

The principle of the seventh node equipment is as follows.

The recording means 13 makes the combination acquired by the controlling means 12 correspond to a time given from outside when the combination is given, and makes records of both the combination and the corresponding time, along with invalidating, among combinations whose records are made in advance, a combination wherein a period of time which has elapsed from a corresponding time exceeds a predetermined upper limit.

In other words, the time necessary for accumulating a combination of identification information and network identification information for recording is limited to the predetermined upper limit or below, so that it is possible to minimize the probability of unnecessarily deteriorating service quality or of originating an incomplete call due to relocation, removal or change of service order, even if no records accumulated in advance are updated at the time of either a terminal being an originating party or a destination party or a node equipment accommodating the terminal in the above-described occasions.

An eighth node equipment according to the present invention has a construction in which any of the above-described first to seventh node equipments further comprises terminal interfacing means 32-1 to 32-n which are provided for accommodation of terminals 31-1 to 31-n and individually provide a physical interface with the terminals 31-1 to 31-n, wherein the controlling means 12 acquires, with regard to each individual call which occurs at any of the terminals 31-1 to 31-n via the terminal interfacing means 32-1 to 32-n, a combination of identification information indicative of both or either of the originating party and the destination party and a network identifier indicative of a network which is connected to an originating party or a destination party individually indicated by the identification information among the single or plurality P of networks.

The principle of the eighth node equipment is as follows.

The terminal interfacing means 32-1 to 32-n individually provide a physical interface with the terminals 31-1 to 31-n, and the controlling means 12 acquires, with regard to each individual call which occurs at any of the terminals 31-1 to 31-n via the terminal interfacing means 32-1 to 32-n, a combination of identification information indicative of both or either of the originating party and the destination party and a network identifier indicative of a network which is connected to an originating party or a destination party individually indicated by the identification information among the single or plurality P of networks.

In other words, with regard to a call whose originating party or destination party corresponds to any of the terminals 31-1 to 31-n accommodated in a local station, the recording means 13 makes a record of a combination containing identification information of the terminal.

Accordingly, the present invention is also applied to a node equipment accommodating any terminal such as a local switch or a PBX.

A ninth node equipment according to the present invention has a construction in which, in any of the above-described first to eighth node equipments, the identification information included in each individual combination whose record is made by the recording means 13 indicates a network in which both or either of the originating party and the destination party is accommodated, and does not contain a unique address to be assigned in the network.

The principle of the ninth node equipment is as follows.

The identification information included in each individual combination whose record is made by the recording means 13 indicates a network in which both or either of the originating party and the destination party is accommodated, and does not contain a unique address to be assigned in the network.

In other words, the information content of combinations to be accumulated as a record will be the minimum content necessary to specify a network, which is to become a candidate for an outgoing line at the time of routing. Accordingly, the size of a storage area and the throughput necessary for accumulating records as well as other resources can be reduced.

A tenth node equipment according to the present invention has a construction in which any of the above-described first to ninth node equipments further comprises maintenance operation assistance means 41 for acquiring a service order which is given via all or part of the single or plurality P of networks, the terminals 31-1s to 31-n accommodated via the terminal interfacing means 32-1 to 32-n, and a communication link and which contains the identification information, wherein, the recording means 13 matches a combination among the combinations accumulated in advance as the record which contains the identification information included in the service order acquired by the maintenance operation assistance means 14, to the service order.

The principle of the tenth node equipment is as follows.

The maintenance operation assistance means 41 acquires a service order which is given via all or part of the single or plurality P of networks, the terminals 31-1s to 31-n accommodated via the terminal interfacing means 32-1 to 32-n, and the communication link and which contains- the identification information, wherein, the recording means 13 matches a combination among the combinations accumulated in advance as the record which contains the identification information included in the service order acquired by the maintenance operation assistance means 14, to the service order.

In other words, the combinations accumulated as a record by the recording means 13 is updated according to updating a service order in a terminal being an originating party or a destination party. Accordingly, a useless incomplete call and deterioration in service quality due to no update are avoided with high reliability.

Figure 2:
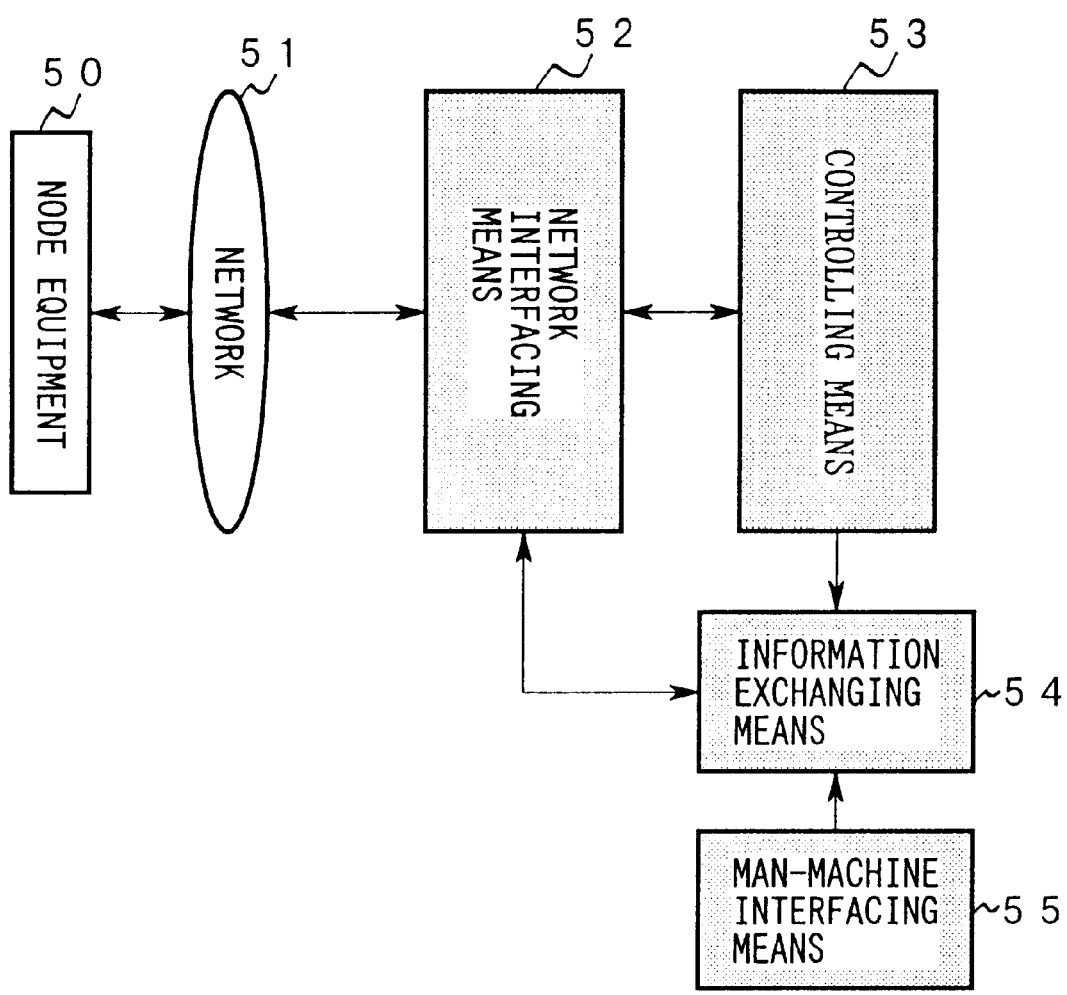
FIG. 2 is a block diagram showing the principle of a terminal equipment according to the present invention.

FIG. 2 is a block diagram showing the principle of a terminal equipment according to the present invention.

The terminal equipment according to the present invention comprises network interfacing means 52 for providing a physical interface with a network 51 connected to any of the above-described first to tenth node equipments 50, controlling means 53 for performing call setup on a call which is received from the network 51 via the network interfacing means 52 or which occurred at a local station, information exchanging means 54 for performing both or either of the transmission and/or the reception of desired transmission information to and from the node equipment 50 via the network interfacing means 52 and the network 51 on the basis of a procedure of call setup performed by the controlling means 53, and man-machine interfacing means 55 for providing a man-machine interface related to setting or updating a service order of the local station, wherein the information exchanging means 54 transmits a service order which is set or updated via the man-machine interfacing means 55, as transmission information.

The principle of the terminal equipment according to the present invention is as follows.

The network interfacing means 52 provides a physical interface with the network 51 connected to any of the above-described first to tenth node equipments 5. The controlling means 53 sets up a call on a call which is received from the network 51 via the network interfacing means 52 or which occurred at the local station.

In addition, the man-machine interfacing means 55 provides a man-machine interface relative to setting or updating of a service order of the local station. The information exchanging means 54 performs both or either of the transmission and/or the reception of desired transmission information to and from the opposed node equipment 50 via the network interfacing means 52 on the basis of the procedure of the above-described call setup, and transmits a service order which is set or updated via the man-machine interfacing means 55, to the node equipment 50 as transmission information.

In other words, high service quality is maintained and running cost is reduced since a service order indicating an operating condition and the like in a terminal equipment according to the present invention is given to the node equipment 50.

A first storage medium according to the present invention is computer-readable and stores a program which causes a computer to function as all or part of the network interfacing means 11-1 to 11-P, the controlling means 12, the recording means 13, the record transferring means 21 and 22, the terminal interfacing means 32-1 to 32-n and the maintenance operation assistance means 41 which construct a node equipment according to any of the above-described first to tenth embodiments.

The principle of the first storage medium is as follows.

The program which causes a computer to function as all or part of the network interfacing means 11-1 to 11-P, the controlling means 12, the recording means 13, the record transferring means 21 and 22, the terminal interfacing means 32-1 to 32-n and the maintenance operation assistance means 41 is made of software to be executed by the computer or a microprogram built in the computer, and can be circulated by being recorded on a removable storage medium separate from the computer.

Accordingly, the computer reading and executing the program in the storage medium according to the present invention is a component of the above-described terminal equipment.

A second storage medium according to the present invention is computer-readable and stores a program which causes a computer to function as all or part of the network interfacing means 52, the controlling means 53, the information exchanging means 54 and the man-machine interfacing means 55 which construct the above-described terminal equipment.

The principle of the second storage medium is as follows.

The program which causes a computer to function as all or part of the network interfacing means 52, the controlling means 53, the information exchanging means 54 and the man-machine interfacing means 55 which construct the above-described terminal equipment is made of software to be executed by a computer or a microprogram built in the computer, and can be circulated by being recorded on a removable storage medium separate from the computer.

Accordingly, the computer reading and executing the program in the storage medium according to the present invention is a component of the above-described node equipment.

Preferred embodiments of the present invention will be described below in detail with reference to the accompanying drawings.

Figure 3:
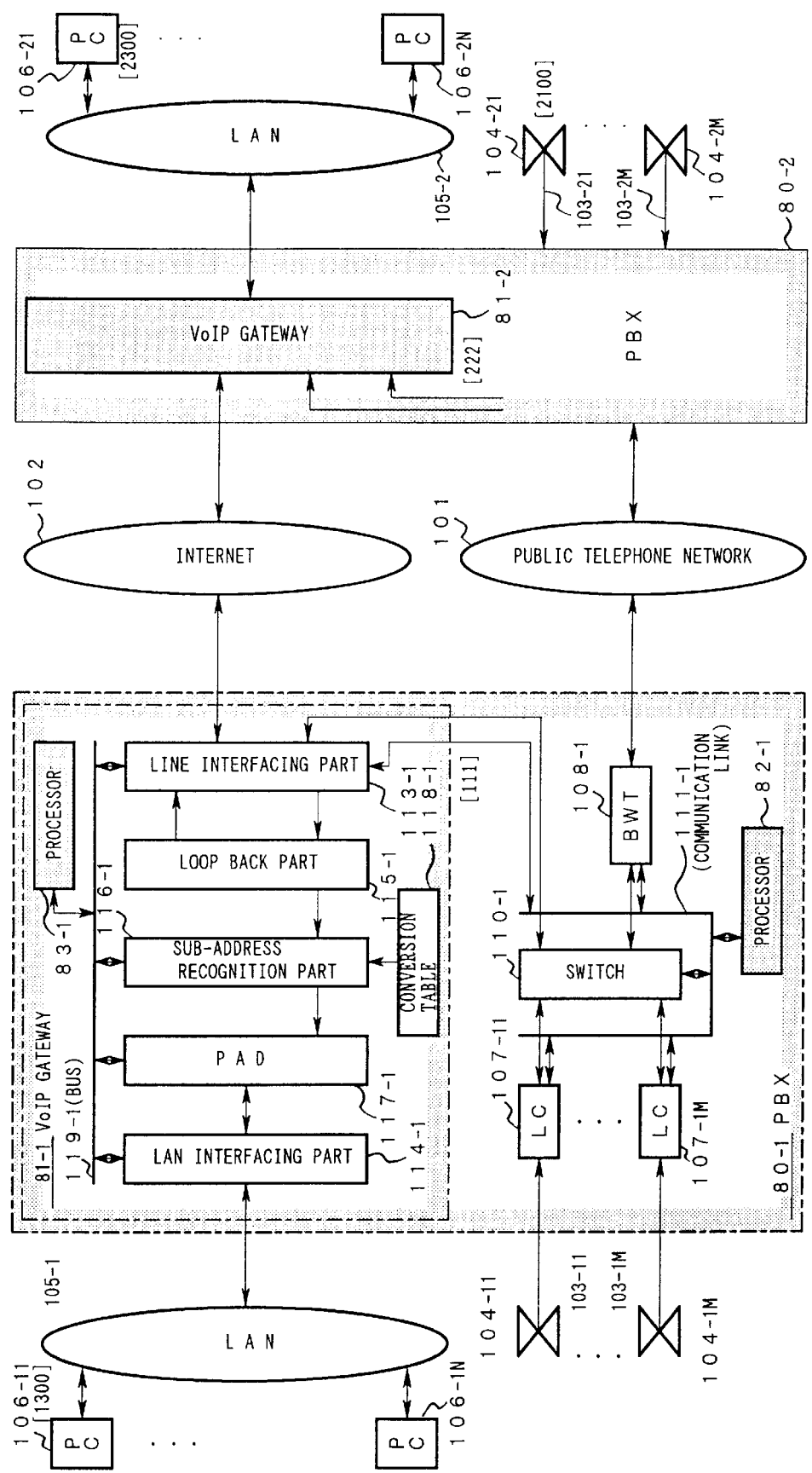
FIG. 3 is a diagram showing the first to fifth embodiments of the present invention.

FIG. 3 is a diagram showing the first to fifth embodiments according to the present invention.

The difference of the construction between each of the first to fifth embodiments and the conventional example shown in FIG. 12 is that PBXs 80-1 and 80-2 are disposed in place of the PBXs 100-1 and 100-2, respectively.

The differences of the construction between the PBX 80-1 and the PBX 100-1 are that VoIP gateways 81-1 and 81-2 are disposed in place of the VoIP gateways 109-1 and 109-2, respectively and a processor 82-1 is disposed in place of the processor 112-1.

The difference of the construction between the VoIP gateway 81-1 and the VoIP gateway 109-1 is that a processor 83-1 is disposed in place of the processor 120-1.

Furthermore, since the construction of the PBX 80-2 is identical to that of the PBX 80-1, the components of the former are given reference numerals of the corresponding components of the latter and that have suffix "2" and descriptions and illustration thereof will be omitted in the following.

Figure 4:
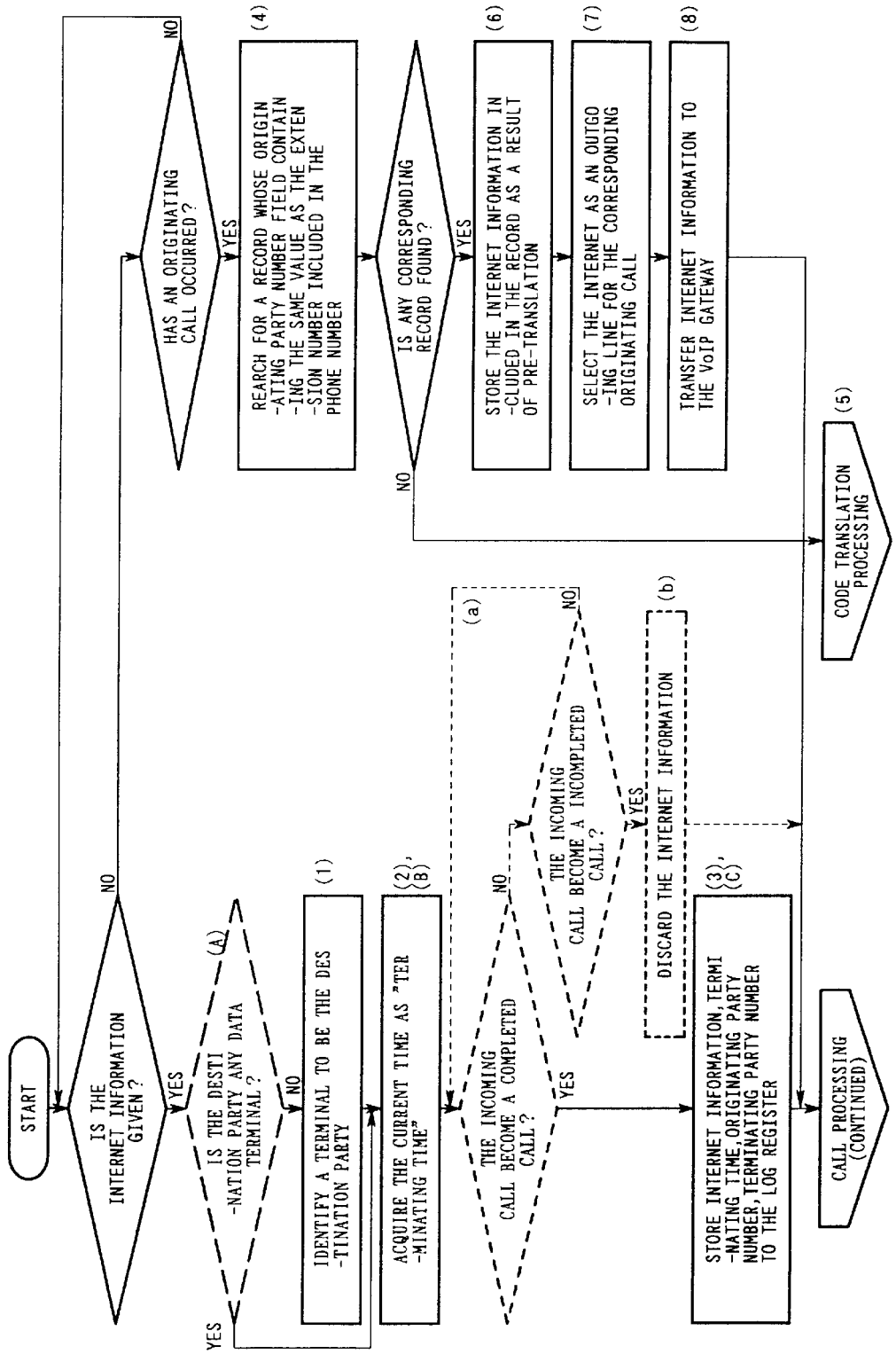
FIG. 4 is a flowchart showing the operation of the first embodiment of the present invention.

FIG. 4 is a flowchart showing the operation of the first embodiment according to the present invention.

Figure 5:
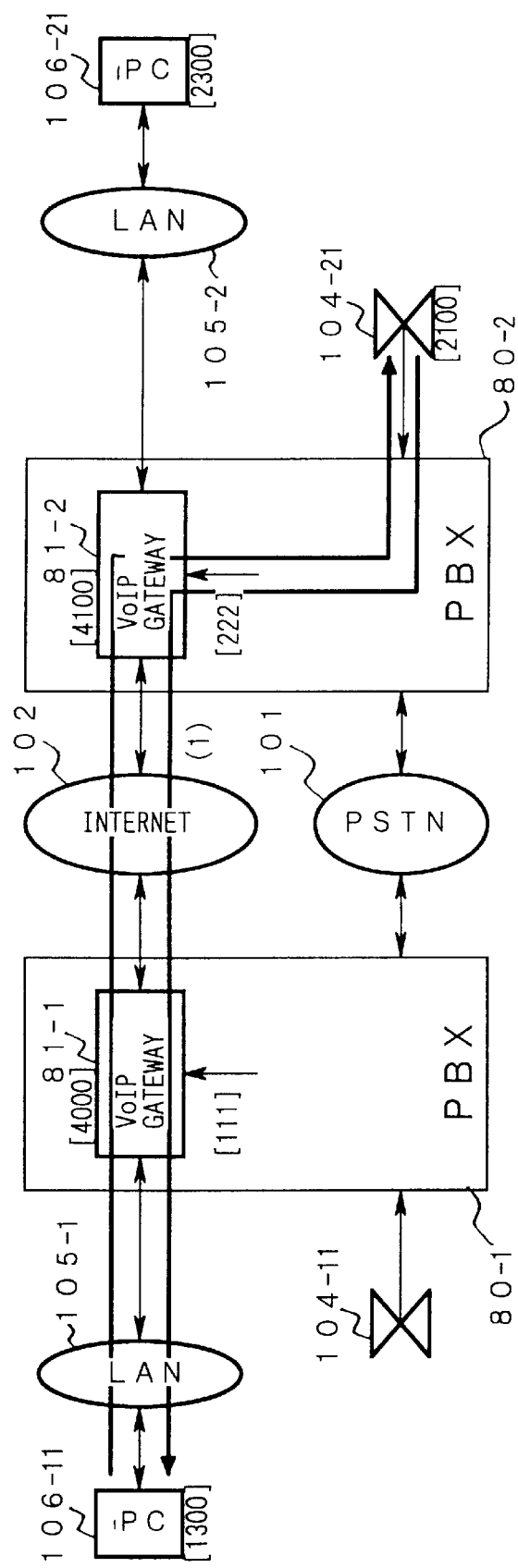
FIG. 5 is a diagram explaining the operation of the first embodiment according to the present invention.

FIG. 5 is a diagram explaining the operation of the first embodiment according to the present invention.

In the following, the operation of the first embodiment according to the present invention will be described with reference to FIGS. 3 to 5.

Figure 6:
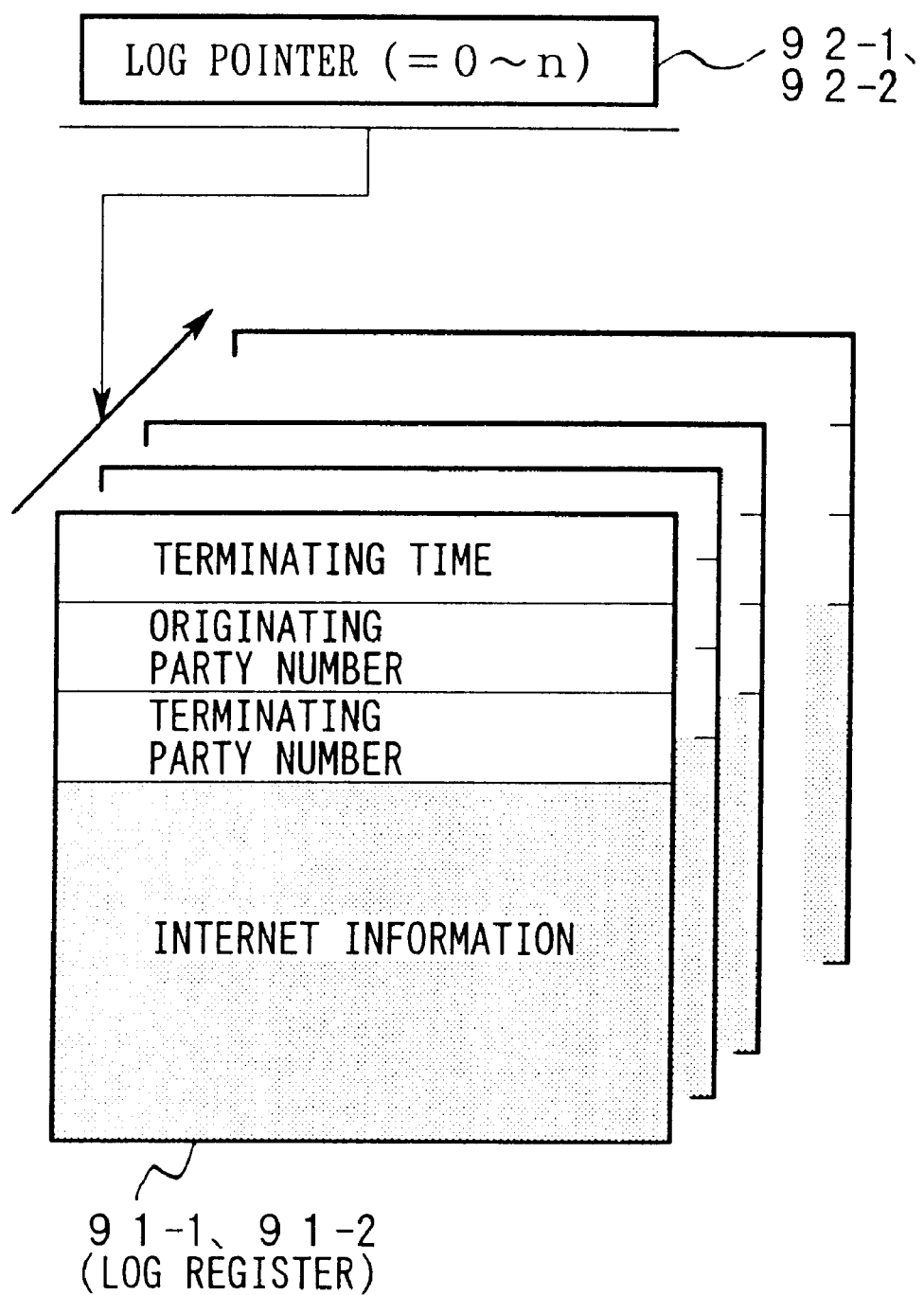
FIG. 6 is a view showing the construction of log registers and log pointers.

With regard to individual incoming calls occurring at the terminals 104-21 to 104-2M and the data terminals 106-21 to 106-2N, the processor 82-2 disposed in the PBX 80-2 has the following log register and log pointer in a main memory, as shown in FIG. 6:

- a log register in which a record which includes terminating time, an originating party number indicating an originating party, a terminating party number indicating a destination party, and internet information (to be described later) is to be stored as a record (the log register is herein denoted by reference numeral 91-2 which has a suffix number "2" that is common to the processor 82-2); and
- a log pointer which indicates the pointer of a record in which a new record is allowed to be stored, among the records of the log register 91-2 (the log pointer is herein denoted by reference numeral 92-2 which has a suffix number "2" that is common to the processor 82-2).

Furthermore, as for a system for storage management to be performed on the log register 91-2 by the processor 82-2 and the procedure of updating processes of the log pointer 92-2 based on the storage management, various known arts can be applied to and none of such arts is a feature of the present invention, so the description thereof will be omitted in the following.

Figure 7:
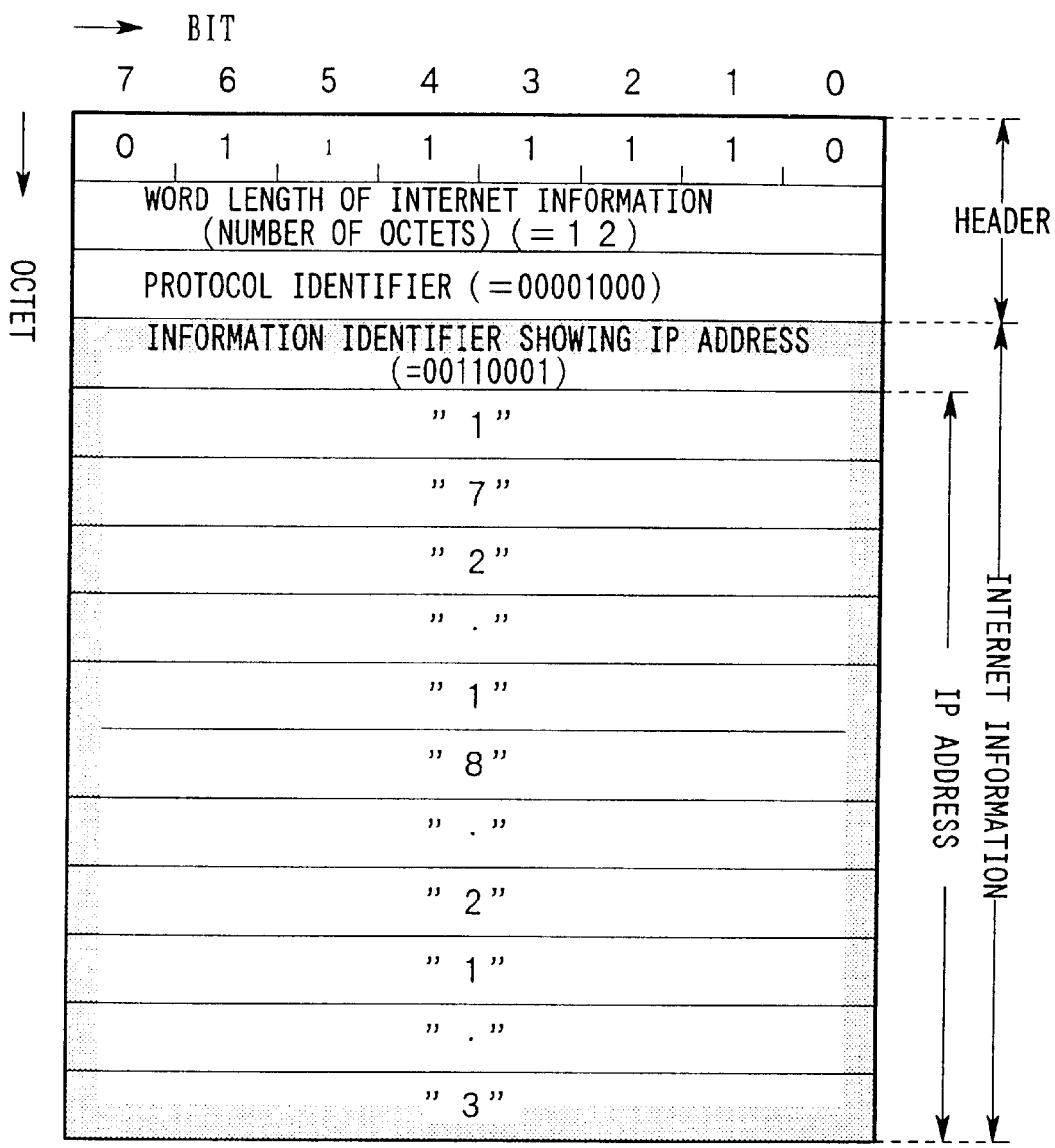
FIG. 7 is a view showing a construction of internet information transmitted from an originating party.

When the data terminal 106-11 originates a call to the terminal 104-21 in a manner similar to the conventional example, the processor 83-1 disposed in the VoIP gateway 81-1 acquires an IP address assigned to the data terminal 106-11, on the basis of the procedure of predetermined call setup (here, for the sake of simplicity, the IP address is assumed to be a global address "172.18.21.3"). Moreover, the processor 83-1 transmits internet information which contains the IP address as shown in FIG. 7, to the internet 102 via the bus 119-1 and the line interfacing part 113-1 as a message related to call setup.

The internet information is transferred to the VoIP gateway 81-2 via the internet 102, and is then given to the processor 83-2 via the line interfacing part 113-2 and the bus 119-2 in the VoIP gateway 81-2.

When the internet information is given to the processor 83-2, the processor 83-2 judges whether the destination party of the corresponding incoming call is any of the data terminals 106-21 to 106-2N accommodated in the LAN 105-2.

When the judging result is false, the processor 83-2 transmits the corresponding internet information to the opposing processor 82-2 via the communication link 111-2.

When the internet information is given to the processor 82-2, the processor 82-2 identifies a terminal to be the destination party of the corresponding incoming call, from among the terminals 104-21 to 104-2M (FIG. 4(1)).

Moreover, the processor 82-2 acquires the point in time as "terminating time" (FIG. 4(2)), and stores an originating party number (=the extension number "1300") and a terminating party number (=the extension number "2100") which have been obtained on the basis of the procedure of call setup, in a record addressed by the log pointer 92-2 among the records of the log register 91-2, together with the internet information and terminating time (FIG. 4(3)).

Furthermore, in the process in which the incoming call becomes a completed call, operations which are cooperatively performed by the each part of the PBXs 80-1 and 80-2 and the VoIP gateways 81-1 and 81-2 are identical to those performed in the conventional example, except for the above-described processing, and therefore, the description of such operations is omitted herein.

When, for example, a call to the data terminal 106-11 accommodated in the LAN 105-1 is to be originated at the terminal 104-21, a phone number to be set by an operator does not contain the GW number "4000", as in the case of the conventional example, and is made of the previously described line number "111", and the extension number "1300" assigned to the data terminal 106-11.

In the process of the call processing of the originated call, the processor 82-2 performs pre-translation processing on the basis of the following procedure prior to code translation processing to be performed on the basis of a procedure similar to that used in the conventional example.

(1) The processor 82-2 searches for a record whose "originating party number" field contains the same value as the extension number "1300" included in the above-described phone number, from among available records of the log register 91-2 (FIG. 4(4)).

(2) When the corresponding record is not at all searched for, the processor 82-2 starts the previously described code translation processing (FIG. 4(5)).

(3) On the other hand, when the corresponding record is searched for, the processor 82-2 acquires internet information (IP address) which is contained in the record, as the result of the previously described pre-translation processing (FIG. 4(6)), and omits the code translation processing.

After the result of the above-described code translation processing has been obtained, the processor 82-2 selects the public telephone network 101 as an outgoing line on the basis of a numbering plan, and transfers the corresponding phone number to the PBX 100-1 via the public telephone network 101 as a message which means notice of an incoming call.

Furthermore, in the above-described case, operations which are cooperatively performed by the each part of the PBX 100-1 and the VoIP gateway 81-1 are identical to those performed in the conventional example, and therefore, the description of such operations is omitted herein.

However, when the result of the above-described pre-translation processing is obtained, the processor 82-2 selects the internet 102 as an outgoing line for the corresponding originated call (FIG. 4(7)). Moreover, the processor 82-2 transfers internet information (IP address) which is the result of the pre-translation processing, to the VoIP gateway 81-2 via the second particular line on the basis of the procedure of call setup (FIG. 4(8)).

Furthermore, as compared with the processing performed by the VoIP gateway 81-1 for the call originated to the data terminal 106-11 at the terminal 104-21 in the conventional example, processing performed by the VoIP gateway 81-2 in the process of call setup for the corresponding originating call in the above-described case is basically the same, except that the outgoing line is not the LAN 105-1 but the internet 102. Therefore, the description of the processing is omitted herein.

Moreover, as compared with the processing performed by the VoIP gateway 81-1 for the call originated to the data terminal 106-11 at the terminal 104-21 in the conventional example, processing performed by the VoIP gateway 81-1 in cooperation with the VoIP gateway 81-2 in the process of call processing for the originating call is basically the same, except that the incoming line is not the LAN 105-1 but the previously described second particular line. Therefore, the description of the processing is omitted herein.

In this manner, according to the present embodiment, no restrictions are imposed on phone numbers to be set by the operator of the terminal 104-21, and with regard to an originating call whose terminating party should be an originating party of an antecedent actual call terminated via the internet 102, an outgoing line is highly reliably and preferentially set to the internet 102, as shown in FIG. 5(1).

In other words, at any of the terminals 104-21 to 104-2M, the internet 102 which is far more inexpensive in charge than the public telephone network 101 can be positively applied without the risk of increasing the complexity of operation during origination, whereby a reduction in running cost is realized.

Furthermore, in the present embodiment, the IP address assigned to the data terminal 106-11 in advance, which is an originating party of an incoming call that has actually occurred, is stored in the log register 91-2 as the previously described internet information.

Figure 8:
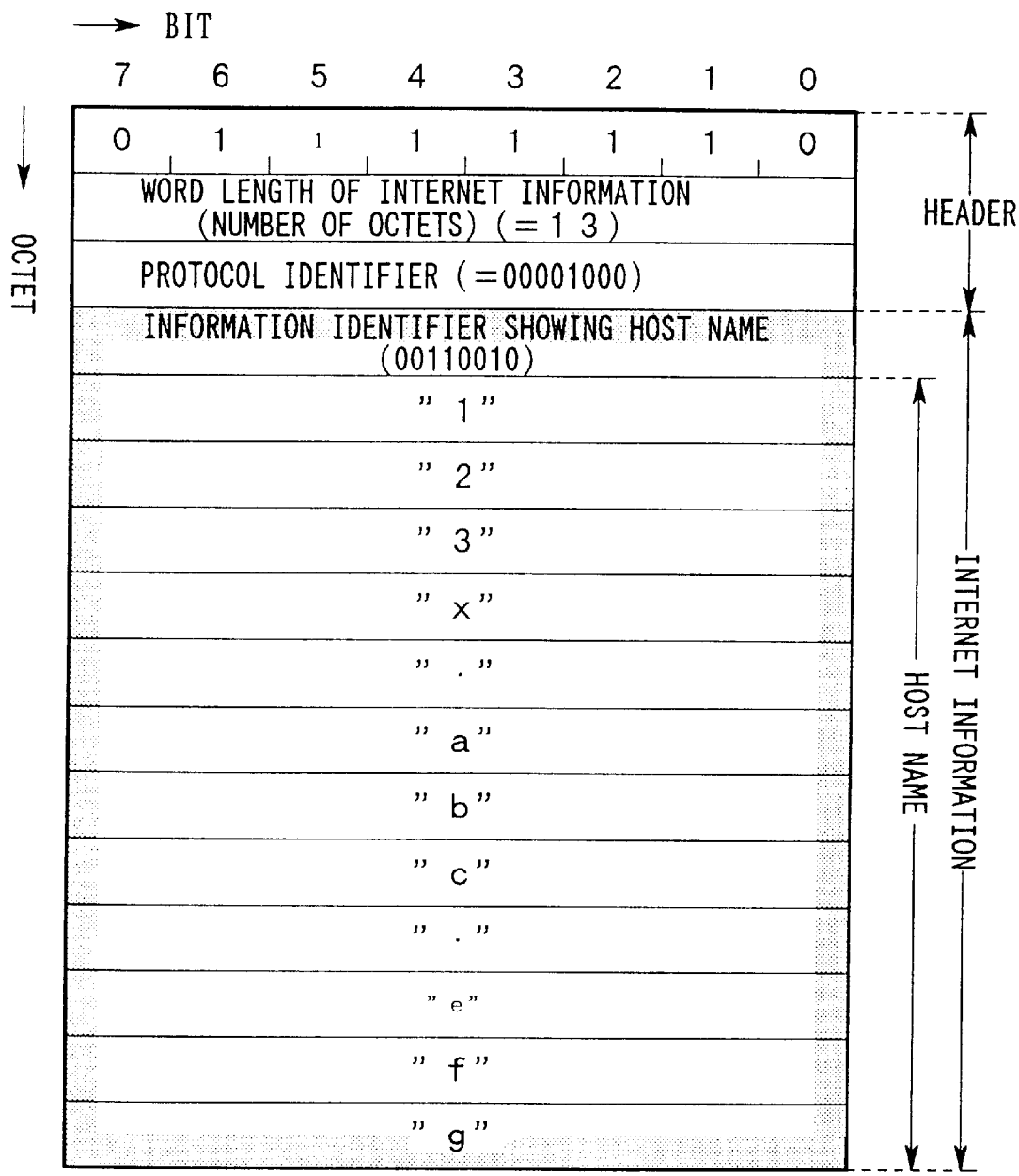
FIG. 8 is a view showing another construction of internet information transmitted from an originating party.

However, if the IP address can be reliably obtained via DNS (Domain Name System) or the like, the host name of the data terminal 106-11 "123X.abc.efg" may also be applied instead of the IP address, as shown in FIG. 8 by way of example.

Besides, in the present embodiment, the IP address described above is stored in the log register 91-2 as the internet information.

However, for example, the internet information may be any type of information that can be reliably acquired in the process of call processing or call setup and that enables the internet 102 to be reliably selected as an outgoing line, like identification information which indicates any of the following exchanges (node equipment) or outgoing line:

an exchange (node equipment) in which is accommodated the terminal of an originating party of a call which is a record object;

an exchange (node equipment) which has performed transit exchange of the call; and an outgoing line which is selected by the exchanges (node equipments)

Moreover, since such an information has a small information content compared to the above-described IP address, the size of the log register 91-2 to be referred to in the process of call processing is made smaller, and it is possible to realize an increase in the efficiency of call processing and a reduction in resources to be applied to the call processing.

In the following, the operation of the second embodiment according to the present invention will be described with reference to FIGS. 3 to 8.

The difference between the second embodiment and the previously described first embodiment is in the following processing which is performed by the processor 82-2 in the PBX 80-2.

When the internet information is given to the processor 82-2, the processor 82-2 judges whether the destination party of the corresponding incoming call corresponds to any of the terminals 104-21 to 104-2M.

Further, limited to the case when the result of the judgement is true, the processor 82-2 acquires the point in time as the previously described terminating time.

However, until the moment when the corresponding incoming call becomes a completed call, the processor 82-2 defers executing the processing of storing the originating party number (=the extension number "1300") and the terminating party number (=the extension number "2100") which have been obtained on the basis of the procedure of call setup, in the record indicated by the log pointer 92-2 among the records of the log register 91-2, together with the previously described internet information and terminating time (FIG. 4(a)).

Besides, when the corresponding incoming call becomes an incomplete call, the processor 82-2 discards the internet information, terminating time, originating party number, and terminating party number (FIG. 4(b)), and does not perform the above-described processing.

In other words, the log register 91-2 stores the terminating time, the originating party number, the terminating party number, and the internet information with regard to only a completed call of all the incoming calls terminated via the internet 102 and the VoIP gateway 81-2.

In this manner, according to the present embodiment, since a record of internet information about only a data terminal which is normally operating, among the data terminals 106-11 to 106-1N is made, internet information about a data terminal at which a completed call is never able to occur is not stored in any of the records of the log register 91-2.

In the following, the operation of the third embodiment according to the present invention will be described with reference to FIGS. 3 to 8.

The difference between the third embodiment and the previously described first embodiment is in the following procedure of processing performed by the processor 83-1 disposed in the VoIP gateway 81-1 when a call originated by the data terminals 106-21 to the data terminal 106-11 terminates to the VoIP gateway 81-1 via the internet 102.

Furthermore, it is assumed that the data terminal 106-21 is assigned an extension number "2300" in advance by the processor 82-2 disposed in the PBX 80-2.

With regard to individual incoming calls occurring at the terminals 104-11 to 104-1M and the data terminals 106-11 to 106-1N, the processor 82-1 disposed in the PBX 80-2 has a log register 91-1 and a log pointer 92-1 in a particular area of a main memory, as shown in FIG. 6. A record which includes terminating time, an originating party number indicative of an originating party, a terminating party number indicative of a destination party, and internet information to be described later is stored as a record in the log register 91-1, and the log pointer 92-1 indicates a record in which a new record is allowed to be stored, among the records of the log register 91-1.

Furthermore, such a storage management of the log register 91-1 is performed by the processor 82-1 on the basis of the same system as the system for storage management to be performed on the log register 91-2 by the processor.

When the data terminals 106-21 originates a call to the terminal 106-11, the processor 83-2 disposed in the VoIP gateway 81-2 transmits internet information which contains an IP address assigned to the data terminals 106-21, to the internet 102 via the bus 119-2 and a line interfacing part 131-2 on the basis of a predetermined procedure of-call setup.

On the other hand, the internet information is given to the VoIP gateway 81-1 via the internet 102, and is then given to the processor 83-1 via the line interfacing part 113-1 and the bus 119-1 in the VoIP gateway 81-1.

When the internet information is given to the processor 83-1, the processor 83-1 judges whether the destination party of the corresponding incoming call is any of the data terminals 106-11 to 106-1N accommodated via the LAN 105-1 (FIG. 4(A)), and the processor 83-1 gives the processor 82-1 the corresponding internet information together with controlling information indicative of the result of the judgement via the communication link 111-1.

When the controlling information and internet information are given to the processor 82-1, the processor 82-1 acquires the point in time as previously described "terminating time" when the controlling information designates that the above-described destination party is any of the data terminals 106-11 to 106-1N (FIG. 4(B)).

Moreover, the processor 82-1 stores the originating party number (=the extension number "2300") and the terminating party number (=the extension number "1300") which have been obtained on the basis of the procedure of call setup, in the record addressed by the log pointer 92-1 among the records of the log register 91-2, together with the above-described internet information and terminating time (FIG. 4(C)).

In other words, even with regard to a call which terminates to any of the data terminals 106-11 to 106-1N via the internet 102, the corresponding internet information is stored in the log register 91-1 automatically.

Even in the process of call processing on an originating call occurring at any of the terminals 104-11 to 104-1M, the internet information is referred to as a routing reference by the processor 82-1.

Furthermore, the procedure of processing performed by the processor 82-1 is identical to the procedure of processing performed by the processor 82-2 in the previously described first embodiment, and the description of such procedure is omitted herein.

In other words, as compared with the first embodiment, a large amount of internet information which can be used for identification of the originating party of an incoming call that has actually occurred is extensively collected to be referred to, whereby a channel which passes through the internet 102 can be ensured with high reliability.

Furthermore, in the third embodiment, the internet information which contains the above-described controlling information is given to the processor 82-1 disposed in the PBX 80-1 which accommodates the data terminals 106-11 to 106-IN via the VoIP gateway 81-1 and the LAN 105-1.

However, an exchange to be given the controlling information and internet information as objects of record may be, for example, a tandem switch when the present invention is applied to a public network, or may also be a signal transfer point (STP) or a signal end point (SEP) connected via a common channel signaling network or a predetermined signal link.

In a case in which the processor 82-1 transmits internet information to any of the tandem switch, signal transfer point, and signal end point, only internet information relative to both or either one of an incoming call and an originated call which have occurred at any of the terminals 104-11 to 104-1M and any of the data terminals 106-11 to 106-1N is stored in the log register 91-1, whereby the distribution of functions and loads which serve as information sources of internet information which becomes a routing reference is realized, and moreover, efficient utilization of resources can be realized.

Figure 9:
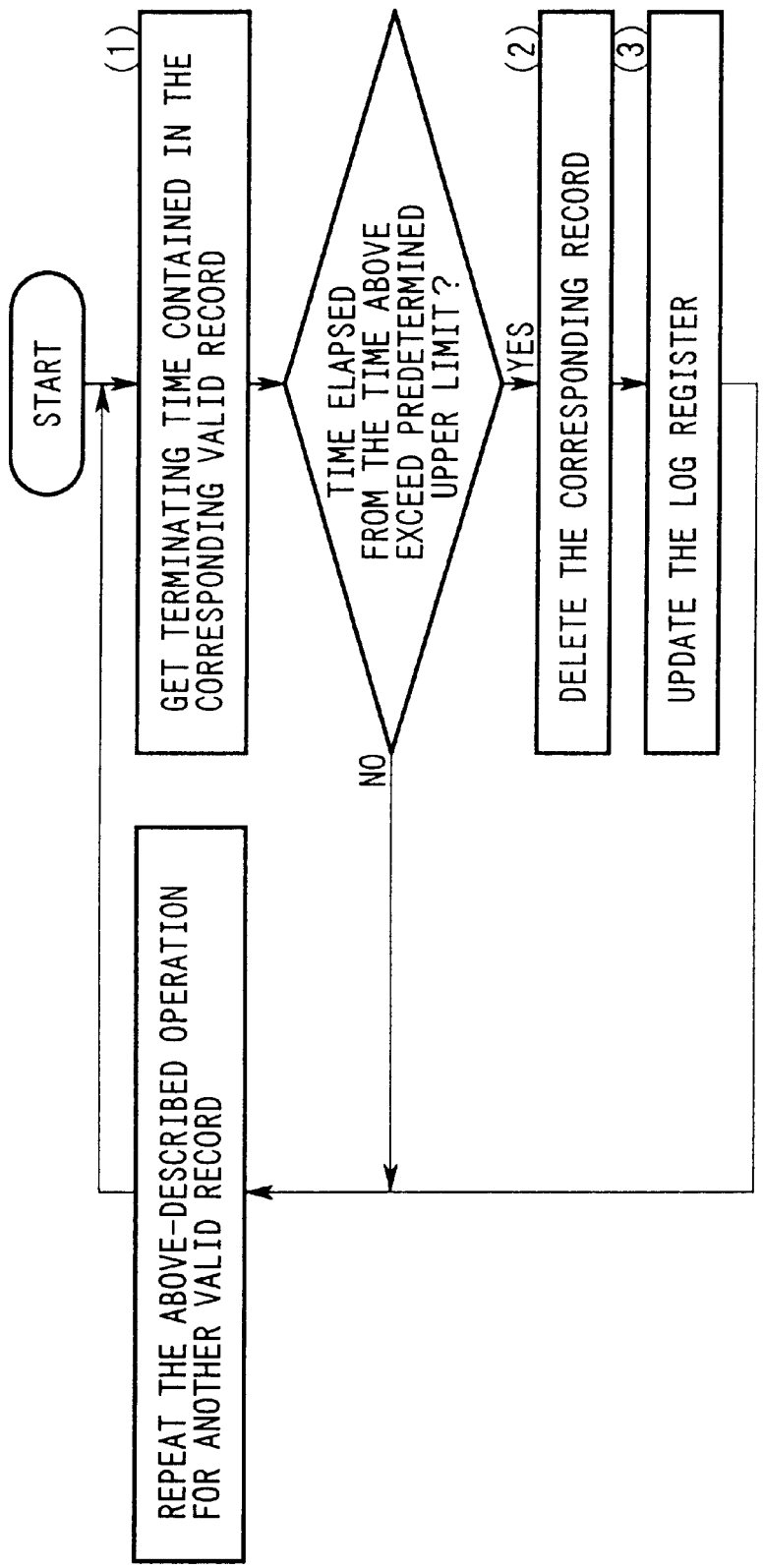
FIG. 9 is a flowchart showing the operation of the fourth embodiment according to the present invention.

FIG. 9 is a flowchart of the operation of the fourth embodiment according to the present invention.

In the following, the operation of the fourth embodiment according to the present invention will be described with reference to FIGS. 3 and 5 to 9.

The difference between the fourth embodiment and each of the first, second, and third embodiments is in the following processing performed by the processors 82-1 and 82-2 which are respectively disposed in the PBXs 80-1 and 80-2.

Since the following processing is performed by each of the processors 82-1 and 82-2 in parallel on the basis of a similar procedure, the following description will focus on only the processor 82-1 for the sake of simplicity.

Concerning to the individual valid record of the log register 91-1 (FIG. 9(1)), the processor 82-1 determines time which has elapsed since the terminating time contained in the corresponding valid record, and when the time exceeds a predetermined upper limit, the processor 82-1 deletes the corresponding record (FIG. 9(2)) and updates the log pointer 92-1 on the basis of algorithms for storage management (FIG. 9(3)).

Specifically, the log register 91-1 does not hold internet information related to a data terminal which has not been an originating party of any incoming call over a time period exceeding the above-described upper limit.

Accordingly, the fourth embodiment makes it possible to avoid the occurrence of an unnecessary incomplete call due to the fact that internet information related to a data terminal which might have been relocated or removed with high probability is continuously stored in the log register 91-1, and invalid allotment of the record of the log register 91-1.

Figure 10:
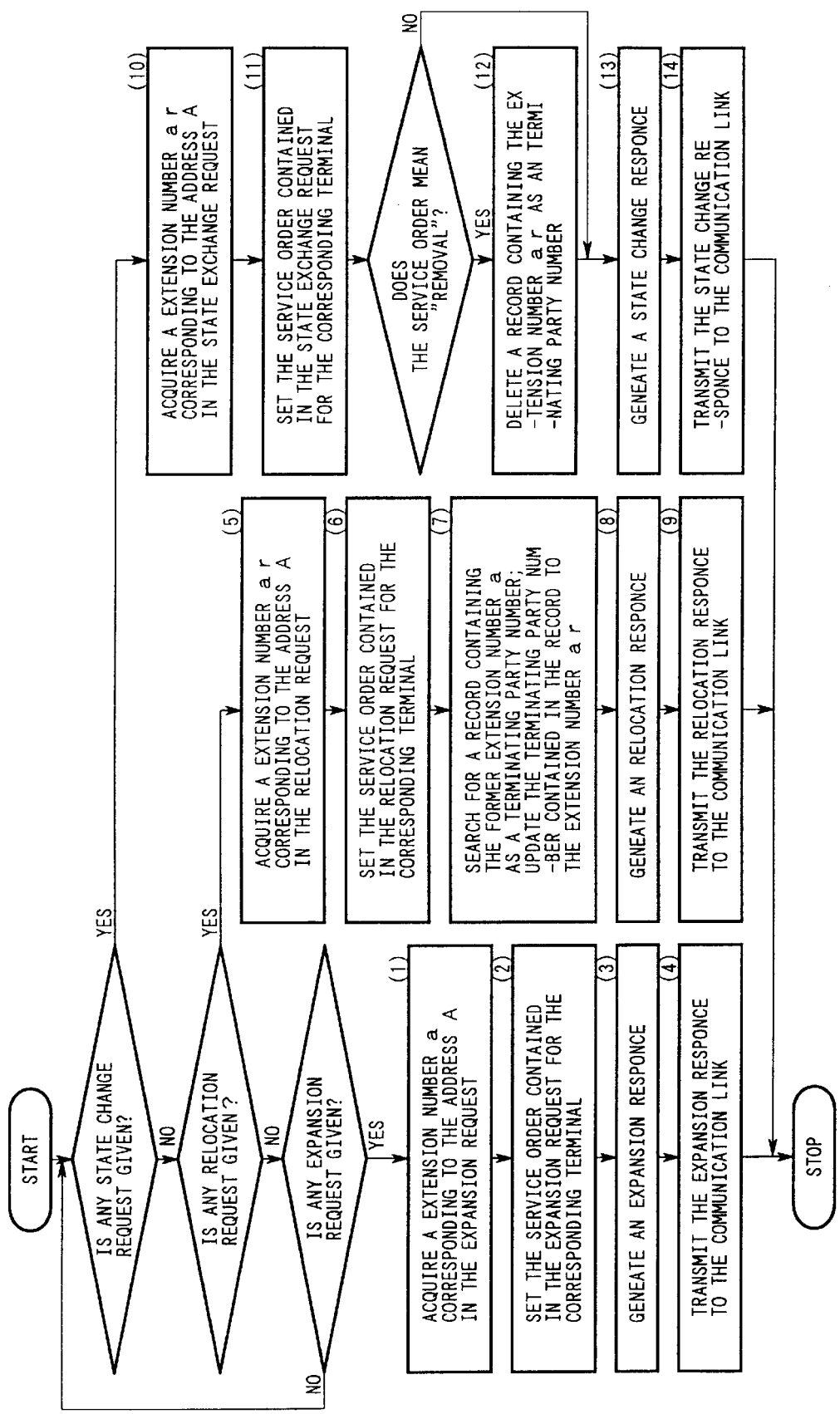
FIG. 10 is a flowchart showing the operation of the fifth embodiment according to the present invention.

FIG. 10 is a flowchart showing the operation of the fifth embodiment according to the present invention.

In the following, the operation of the fifth embodiment according to the present invention will be described with reference to FIGS. 3 and 5 to 8 and 10.

The feature of the fifth embodiment is in the procedure of the following processing cooperatively performed by the data terminals 106-11 to 106-1N (106-21 to 106-2N) and the processors 82-1 (82-2), and 83-1 (83-2).

The following description will focus on only the data terminal 106-11 and the processors 82-1 and 82-2 for the sake of simplicity.

When the data terminal 106-11 is started by being supplied with electric power for the first time in the state of being connected to the LAN 105-1, the data terminal 106-11 generates an expansion request which includes a service order indicative of a desired form of service as shown in FIG. 11(*a*), together with a unique address A on the LAN 105-1, and transmits the expansion request to the LAN 105-1.

Furthermore, the form of service indicated by the service order means, regarding the data terminal 106-11, for example, its phone number and its accommodated location, the kind and mode of service to be provided, and the kind of service to be restrained from providing.

In the VoIP gateway 81-1, the processor 83-1 receives the expansion request via the LAN interface part 114-1 and the bus 119-1, and judges whether the address A contained in the expansion request is normal.

When the result of the judgement is true, the processor 83-1 transmits the processor 82-1 the corresponding expansion request via the bus 119-1, the line interfacing part 113-1, and the communication link 111-1.

The processor 82-1 acquires a unique extension number a (which is herein assumed to be "1300" for the sake of simplicity) which corresponds to the address A contained in the expansion request (FIG. 10(1)), and sets the service order contained in the expansion request, as a service order for a terminal corresponding to the expansion request (FIG. 10(2)).

When the processor 82-1 completes such a processing, the processor 82-1 generates an expansion response which represents a meaning of the completion of the processing and contains the above-described address A and extension number a, as shown in FIG. 11(*b*) (FIG. 10(3)), and transmits the expansion response to the communication link 111-1 (FIG. 10(4)).

The processor 83-1 receives the expansion response via the line interfacing part 113-1 and the bus 119-1, and holds the address A and the extension number a which are contained in the expansion response, in a form which can be referred to in the process of call setup.

Moreover, the processor 83-1 transmits the corresponding expansion response to the LAN 105-1 via the bus 119-1 and the LAN interface part 114-1.

The data terminal 106-11 shifts to a normal operating state at the moment when the data terminal 106-11 receives the expansion response.

Furthermore, a cooperative operation performed by each part to realize the delivery of various messages between the data terminal 106-11 and the processor 83-1 and between the processor 83-1 and the processor 82-1 is as described previously, with regard to both the above-described expansion request and expansion response, and therefore, the description of such cooperative operation will be omitted in the following.

In a case where the data terminal 106-11 is assigned an address Ar instead of the above-described address A at the time of relocation or the like, the data terminal 106-11 generates, according to the address Ar, a relocation request which contains the service order previously described and an extension number which is assigned in advance (hereinafter referred to as the "former extension number"), as shown in FIG. 11(*c*), and transmits the relocation request to the LAN 105-1.

When the processor 83-1 confirms the normality of the relocation request, the processor 83-1 transfers the relocation request to the processor 82-1.

The processor 82-1 acquires a unique extension number ar (which may be the same as the former extension number "1300") which corresponds to the address Ar contained in the relocation request (FIG. 10(5)), and sets the service order contained in the relocation request, as the service order of a terminal assigned the extension number ar (FIG. 10(6)).

Moreover, the processor 82-1 searches for a record which contains the above-described former extension number as a terminating party number, from among valid records of the log register 91-1, and updates the terminating party number contained in the corresponding record to the extension number ar (FIG. 10(7)).

When the processor 82-1 complete such a processing, the processor 82-1 generates a relocation response which represents a meaning of the completion of the processing and contains the above-described address Ar and extension number ar, as shown in FIG. 11(*d*) (FIG. 10(8)), and transmits the relocation response to the communication link 111-1 (FIG. 10(9)).

The processor 83-1 receives the relocation response, and holds the address Ar and the extension number ar which are contained in the relocation response, in a form which can be referred to in the process of call setup.

Moreover, the processor 83-1 gives the corresponding relocation response to the data terminal 106-11 via the LAN 105-1, and the data terminal 106-11 shifts to a normal operating state based on a new address Ar at the moment when the data terminal 106-11 receives the relocation response.

When an operation related to removal or the change of the service order previously described is performed on the data terminal 106-11 by the operator, the data terminal 106-11 generates, a state change request which contains, in addition to the address Ar, the extension number "1300", which is assigned in advance, and a service order after the change (which may be a removal request), as shown in FIG. 11(*e*)), and transmits the state change request to the LAN 105-1.

When the processor 83-1 confirms the normality of the state change request, the processor 83-1 transfers the state change request to the processor 82-1.

The processor 82-1 acquires a unique extension number ar corresponding to the address A contained in the state change request (FIG. 10(10)), and sets the service order contained in the state change request, as the service order of a terminal which corresponds to the extension number ar (FIG. 10(11)).

Moreover, when the service order means the previously described removal, the processor 82-1 deletes a record which contains the above-described extension number ar as an terminating party number, from among the valid records of the log register 91-1 (FIG. 10(12)).

When the processor 82-1 completes such a processing, the processor 82-1 generates a state change response which represents a meaning of the completion of the processing and contains the above-described extension number ar, as shown in FIG. 11(*f*) (FIG. 10(13)), and transmits the state change response to the communication link 111-1 (FIG. 10(14)).

The processor 83-1 transfers the state change response to the data terminal 106-11 via the LAN 105-1.

Moreover, at the moment when the data terminal 106-11 receives the state change response, the data terminal 106-11 shifts to a normal operating state based on a new service order or recognizes the completion of the removal.

In this manner, in the present embodiment, with regard to any of the data terminals 106-11 to 106-1N, the corresponding information stored in each of the processors 82-1 and 82-2 (including the log registers 91) is automatically updated according to not only expansion or setting and change of a service order but also removal.

Accordingly, in a communication system according to the above-described first to fourth embodiments, the occurrence of an unnecessary incomplete call due to applying the present invention is avoided. Moreover, a work saving and a cost reduction in maintenance and operation can be realized.

It is to be noted that the interface between each of the LANs 105-1 and 105-2 and the internet 102 is provided under the protocol conversion performed by the corresponding one of the VoIP gateways 81-1 and 81-2.

However, the present invention is not limited to the internet 102, and can be applied to any network, which differ in all or part of signaling system, transmission system, and protocol from the above-described first particular port and second particular port.

In addition, in each of the above-described embodiments, the interface between each of the LANs 105-1 and 105-2 and the internet 102 is provided by the corresponding one of the VoIP gateways 81-1 and 81-2.

However, when the present invention is applied to one or more than three networks which differ in all or part of signaling system, transmission system, and protocol from the first particular port and the second particular port, an equipment corresponding to the VoIP gateways 81-1 and 81-2 may be connected to such one or more than three networks.

Moreover, in each of the above-described embodiments, the present invention is applied to each of the PBXs 80-1 and 80-2 which the terminals 104-11 to 104-1M and 104-21 to 104-2M are respectively accommodated.

However, the present invention is not limited to the PBXs 80-1 and 80-2, and can also be similarly applied to not only gateway exchanges and local switches in which predetermined subscriber's lines are accommodated in a public telephone network, but also various other node equipment such as the following gateway, bridge, router, and DSU:

a gateway which performs protocol conversion in all the seven layers of the OSI between different networks;

a bridge which performs protocol conversion in a MAC sublayer between different networks;

a router which performs routing by referring to a header in a network layer between different networks; and a DSU which is arranged at a relay point or an end of a desired network and is assigned a unique address individually.

In the description of each of the above-described embodiments, no reference has been made to signaling systems which are applied between the PBXs 80-1 and 80-2 and the public telephone network 101 and to the previously described first particular port and second particular port.

However, such signaling system are not the feature of the present invention, and known various signaling systems can be applied to the signaling systems.

Moreover, in each of the above-described embodiments, the processor 82-1 (82-2) makes a record, such as internet information, of an incoming call which terminates to any of the terminals 104-11 to 104-1M (104-21 to 104-2M) or any of the data terminals 106-11 to 106-1N (106-21 to 106-2N) via the internet 102.

However, regarding internet information, the processor 82-1 (82-2) may also make a record of an originating call which occurs at any of the terminals 104-11 to 104-1M (104-21 to 104-2M) or any of the data terminals 106-11 to 106-1N (106-21 to 106-2N) and whose outgoing line is selected to the internet 102.

In each of the above-described embodiments, a record such as internet information is made by a terminal of a destination party or a PBX in which data terminals are accommodated.

However, the record of internet information may also be made by a PBX or a tandem switch in which a terminal or a data terminal which is the originating party of a corresponding call is accommodated.

In each of the above-described embodiments, the terminating time is stored in the log registers 91-1 and 91-2. However, for example, even in a case which is not equivalent to the previously described fourth embodiment, no terminating time may be stored in either of the log registers 91-1 or 91-2 when a lowering in the reliability of internet information or the like which is stored in advance in the log registers 91-1 and 91-2 can be tolerated or can otherwise be alleviated or avoided.

In each of the above-described embodiments, the data terminals 106-11 to 106-1N and the data terminals 106-21 to 106-2N each provided with hardware and software adaptable to an internet telephone are used for speech communication.

However, the present invention can also be applied to a case in which the data terminals 106-11 to 106-1N and 106-21 to 106-2N and the terminals 104-11 to 104-1M and 104-21 to 104-2M are used for data communication.

Moreover, in this case, in the processing performed by the processors 82-1 and 82-2, processing which relates to the present invention may also be performed by cooperative operation of the each part of the VoIP gateways 81-1 and 81-2 under the control of the processors 83-1 and 83-2.

In each of the above-described embodiments, information, such as internet information, which is stored in the log registers 91-1 and 91-2 is referred to so that an outgoing line is set to the internet 102 which is in general far more inexpensive in charge than the public telephone network 101.

However, for example, when both the VoIP gateways 81-1 and 81-2 are connected in common to a plurality of communication networks, such information may also be referred to as a candidate for any of the following outgoing lines:

- an outgoing line having a fast transmission speed;
- an outgoing line having a small degree of congestion;
- an outgoing line which corresponds to the smallest number of digits of a phone number (inclusive of a dial-in phone number) to be set by an originating party;
- an outgoing line which can be substituted for a line in which a trouble has occurred; and
- an outgoing line which satisfies other desired criteria and conditions.

Moreover, in each of the above-described embodiments, information which is stored in advance in the log registers 91-1 and 91-2 is directly referred to by the respective processors 82-1 and 82-2 in which the log registers 91-1 and 91-2 are respectively allocated in the particular areas of the main memories.

However, such information may also be referred to by inquiring of node equipment provided with memories corresponding to the log registers 91-1 and 91-2. Here, the node equipment may be not only PBXs, local switches, tandem switches, signal transfer points or signal end points which are opposed to each other via a predetermined link, but also the above-described gateways, routers or bridges.

The present invention is not limited to any of the above-described embodiments and can be put into practice in various forms without departing from the scope of the present invention, and any improvement may also be applied to all or part of components.

What is claimed is:

1. A node equipment comprising:
    network interfacing means for individually providing physical interface with a single or a plurality P of networks;
    controlling means for performing call setup or protocol conversion inclusive of routing on each individual call which occurs at both or either of said single or plurality P of networks and a local station, and acquiring a combination of identification information individually indicative of both or either of an originating party and/or a destination party and a network identifier indicative of a network which is connected to said originating party or destination party individually indicated by said identification information among said networks; and
    recording means for making a record of the combination acquired by said controlling means,
    wherein said controlling means selects a network which is indicated by a network identifier combined with identification information indicative of a destination party of the call as a candidate for an outgoing line in a process of routing, among identification information included in the combination whose record is made in advance by said recording means when a call occurs at said single or plurality P of networks or said local station.

2. A node equipment according to claim 1, wherein said recording means makes a record of the combination acquired by said controlling means, only in the case of a call which is identified as a completed call by said controlling means in the process of said call setup or making said protocol conversion.

3. A node equipment according to claim 1, further comprising record transferring means for transmitting the combination acquired by said controlling means to a communication link which does not correspond to any of said single or plurality P of networks or, among the networks, to a network other than the network indicated by the network identifier included in the combination.

4. A node equipment according to claim 2, further comprising record transferring means for transmitting the combination acquired by said controlling means to a communication link which does not correspond to any of said single or plurality P of networks or, among the networks, to a network other than the network indicated by the network identifier included in the combination.

5. A node equipment according to claim 1, further comprising record transferring means for giving the combination acquired by said controlling means to a terminal or a node equipment indicated by the identification information included in the combination, via any of said single or plurality P of networks or via a communication link which does not correspond to any of the networks.

6. A node equipment according to claim 2, further comprising record transferring means for giving the combination acquired by said controlling means to a terminal or a node equipment indicated by the identification information included in the combination, via any of said single or plurality P of networks or via a communication link which does not correspond to any of the networks.

7. A node equipment according to claim 3, wherein said recording means excludes the combination, among the combinations acquired by said controlling means, transmitted to any communication link or network by said record transferring means from being the object of said record, or deletes the combination itself from said record.

8. A node equipment according to claim 4, wherein said recording means excludes the combination, among the combinations acquired by said controlling means, transmitted to any communication link or network by said record transferring means from being the object of said record, or deletes the combination itself from said record.

9. A node equipment according to claim 5, wherein said recording means excludes the combination, among the combinations acquired by said controlling means, transmitted to any communication link or network by said record transferring means from being the object of said record, or deletes the combination itself from said record.

10. A node equipment according to claim 6, wherein said recording means excludes the combination, among the combinations acquired by said controlling means, transmitted to any communication link or network by said record transferring means from being the object of said record, or deletes the combination itself from said record.

11. A node equipment according to claim 1, wherein said recording means makes a record of a combination of a network identifier and identification information, wherein the combination is given via said single or plurality P of networks or said communication link.

12. A node equipment according to claim 1, wherein said recording means makes the combination acquired by said controlling means correspond to a time given from outside when the combination was acquired or a time when the combination is given, and makes records of both the combination and the corresponding time, along with invalidating, among combinations whose records are made in advance, a combination wherein a period of time which has elapsed from a corresponding time exceeds a predetermined upper limit.

13. A node equipment according to claim 1, further comprising terminal interfacing means which is provided for accommodation of terminals and individually provides physical interface with the terminals, wherein said controlling means acquires, with regard to each individual call which occurs at said terminals via said terminal interfacing means, a combination of identification information indicative of both or either of said originating party and said destination party and a network identifier indicative of a network which is connected to an originating party or a destination party individually indicated by the identification information among said single or plurality P of networks.

14. A node equipment according to claim 1, wherein the identification information included in each individual combination whose record is made by said recording means indicates a network in which both or either of said originating party and said destination party is accommodated, and does not contain a unique address to be assigned in the network.

15. A node equipment according to claim 13, further comprising maintenance operation assistance means for acquiring a service order which is given via all or part of said single or plurality P of networks, a terminal accommodated via said terminal interfacing means, and said communication link and which contains said identification information, wherein said recording means matches a combination among the combinations accumulated in advance as said record which contains identification information included in the service order acquired by said maintenance operation assistance means, to the service order.

16. A storage medium which is computer-readable and which stores a program which causes a computer to function as all or part of the constitutional elements of the node equipment, which are:

network interfacing means for individually providing physical interface with a single or a plurality P of networks;

controlling means for performing call setup or protocol conversion inclusive of routing on each individual call which occurs at both or either of said single or plurality P of networks and a local station, and acquiring a combination of identification information individually indicative of both or either of an originating party and/or a destination party and a network identifier indicative of a network which is connected to said originating party or destination party individually indicated by said identification information among said networks; and recording means for making a record of the combination acquired by said controlling means, wherein said controlling means selects a network which is indicated by a network identifier combined with identification information indicative of a destination party of the call as a candidate for an outgoing line in a process of the routing, among identification information included in the combination whose record is made in advance by said recording means when a call occurs at said single or plurality P of networks or said local station.

17. A storage medium which is computer-readable and which stores a program which causes a computer to function as all or part of the constitutional elements of the node equipment, which are:

network interfacing means for individually providing physical interface with a single or a plurality P of networks;

controlling means for performing call setup or protocol conversion inclusive of routing on each individual call which occurs at both or either of said single or plurality P of networks and a local station, and acquiring a combination of identification information individually indicative of both or either of an originating party and/or a destination party and a network identifier indicative of a network which is connected to said originating party or destination party individually indicated by said identification information among said networks;

recording means for making a record of the combination acquired by said controlling means; and record transferring means for transmitting the combination acquired by said controlling means to a communication link which does not correspond to any of said single or plurality P of networks or, among the networks, to a network other than the network indicated by the network identifier included in the combination, wherein said controlling means selects a network which is indicated by a network identifier combined with identification information indicative of a destination party of the call as a candidate for an outgoing line in a process of routing, among identification information included in the combination whose record is made in advance by said recording means when a call occurs at said single or plurality P of networks or local station.

18. A storage medium which is computer-readable and which stores a program which causes a computer to function as all or part of the constitutional elements, of the node equipment, which are:

network interfacing means for individually providing physical interface with a single or a plurality P of networks;

controlling means for performing call setup or protocol conversion inclusive of routing on each individual call which occurs at both or either of said single or plurality P of networks and a local station, and acquiring a combination of identification information individually indicative of both or either of an originating party and/or a destination party and a network identifier indicative of a network which is connected to said originating party or destination party individually indicated by said identification information among said networks;

recording means for making a record of the combination acquired by said controlling means; and record transferring means for giving the combination acquired by said controlling means to a terminal or a node equipment indicated by the identification information included in the combination, via any of said single or plurality P of networks or via a communication link which does not correspond to any of the networks, wherein said controlling means selects a network which is indicated by a network identifier combined with identification information indicative of a destination party of the call as a candidate for an outgoing line in a process of routing, among identification information included in the combination whose record is made in advance by said recording means when a call occurs at said single or plurality P of networks or said local station.

19. A storage medium which is computer-readable and which stores a program which causes a computer to function as all or part of the constitutional elements of the node equipment, which are:

network interfacing means for individually providing physical interface with a single or a plurality P of networks;

controlling means for performing call setup or protocol conversion inclusive of routing on each individual call which occurs at both or either of said single or plurality P of networks and a local station, and acquiring a combination of identification information individually indicative of both or either of an originating party and/or a destination party and a network identifier indicative of a network which is connected to said originating party or destination party individually indicated by said identification information among said networks;

recording means for making a record of the combination acquired by said controlling means; and terminal interfacing means which is provided for accommodation of terminals and individually provides physical interface with the terminals, wherein said controlling means acquires, with regard to each individual call which occurs at said terminals via said terminal interfacing means, a combination of identification information indicative of both or either of said originating party and said destination party and a network identifier indicative of a network which is connected to an originating party or a destination party individually indicated by the identification information among said single or plurality P of networks and selects a network which is indicated by a network identifier combined with identification information indicative of a destination party of the call as a candidate for an outgoing line in a process of routing, among identification information included in the combination whose record is made in advance by said recording means when a call occurs at said single or plurality P of networks or local station.

20. A storage medium which is computer-readable and which stores a program which causes a computer to function as all or part of the constitutional elements of the node equipment, which are:

network interfacing means for individually providing physical interface with a single or a plurality P of networks;

controlling means for performing call setup or protocol conversion inclusive of routing on each individual call which occurs at both or either of said single or plurality P of networks and a local station, and acquiring a combination of identification information individually indicative of both or either of an originating party and/or a destination party and a network identifier indicative of a network which is connected to said originating party or destination party individually indicated by said identification information among said networks;

recording means for making a record of the combination acquired by said controlling means;

terminal interfacing means which is provided for accommodation of terminals and individually provides physical interface with the terminals; and maintenance operation assistance means for acquiring a service order which is given via all or part of said single or plurality P of networks, a terminal accommodated via said terminal interfacing means, and said communication link and which contains said identification information, wherein said recording means matches a combination among the combinations accumulated in advance as said record which contains identification information included in the service order acquired by said maintenance operation assistance means, to the service order, and wherein said controlling means acquires, with regard to each individual call which occurs at said terminals via said terminal interfacing means, a combination of identification information indicative of both or either of said originating party and said destination party and a network identifier indicative of a network which is connected to an originating party or a destination party individually indicated by the identification information among said single or plurality P of networks and selects a network which is indicated by a network identifier combined with identification information indicative of a destination party of the call as a candidate for an outgoing line in a process of routing, among identification information included in the combination whose record is made in advance by said recording means when a call occurs at said single or plurality P of networks or local station.

* * * * *